US012602092B2

(12) United States Patent
Wu et al.

(10) Patent No.: US 12,602,092 B2
(45) Date of Patent: Apr. 14, 2026

(54) FOLDABLE-SCREEN DEVICE AND HINGE COMPONENT

(71) Applicant: HUAWEI TECHNOLOGIES CO., LTD., Shenzhen (CN)

(72) Inventors: Hao Wu, Shenzhen (CN); WenJie Jiang, Shanghai (CN); Gangchao Wang, Shanghai (CN); Zhengyi Xu, Shanghai (CN); Chunjun Ma, Shanghai (CN); Yunyong Li, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 205 days.

(21) Appl. No.: 18/696,437

(22) PCT Filed: Aug. 10, 2022

(86) PCT No.: PCT/CN2022/111316
§ 371 (c)(1),
(2) Date: Mar. 28, 2024

(87) PCT Pub. No.: WO2023/051040
PCT Pub. Date: Apr. 6, 2023

(65) Prior Publication Data
US 2024/0385659 A1 Nov. 21, 2024

(30) Foreign Application Priority Data
Sep. 30, 2021 (CN) .......................... 202111163981.8

(51) Int. Cl.
G06F 1/16 (2006.01)
H04M 1/02 (2006.01)

(52) U.S. Cl.
CPC .......... *G06F 1/1681* (2013.01); *G06F 1/1652* (2013.01); *H04M 1/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,179,559 B1 * | 11/2015 | Kim | .................... | H04M 1/0268 |
| 11,032,402 B2 * | 6/2021 | Liu | .................... | H04M 1/0268 |
| 11,048,296 B2 * | 6/2021 | Hsu | ........................ | G06F 1/1652 |
| 11,301,006 B2 * | 4/2022 | Hsu | ........................ | F16C 11/04 |
| 11,336,759 B2 * | 5/2022 | Liao | .................... | H04M 1/022 |
| 11,889,644 B2 * | 1/2024 | Yang | .................... | H04M 1/022 |

(Continued)

FOREIGN PATENT DOCUMENTS

| | | |
|---|---|---|
| CN | 112995368 A | 6/2021 |

*Primary Examiner* — Lisa Lea-Edmonds
(74) *Attorney, Agent, or Firm* — Fish & Richardson P.C.

(57) ABSTRACT

The present disclosure relates to foldable-screen devices and hinge components. An example hinge component includes an elastic component disposed on a support member. A first end of the elastic component presses against a primary shaft mechanism when a rotation mechanism rotates to a flattened state. A second end of the elastic component is connected to the support member when the rotation mechanism rotates to the flattened state. A compression rate of the elastic component when the rotation mechanism rotates to the flattened state is greater than a compression rate of the elastic component when the rotation mechanism rotates to a folded state.

20 Claims, 16 Drawing Sheets

(56) References Cited

U.S. PATENT DOCUMENTS

| | | | | |
|---|---|---|---|---|
| 12,075,579 B2 * | 8/2024 | Jiang | .................... | H04M 1/0268 |
| 12,137,180 B2 * | 11/2024 | Cheng | ................. | H04M 1/0268 |
| 12,271,236 B2 * | 4/2025 | Feng | .................... | H04M 1/022 |
| 2020/0371553 A1 * | 11/2020 | Hsu | ........................ | G06F 1/1624 |
| 2020/0409429 A1 * | 12/2020 | Hsu | ........................ | E05D 11/06 |
| 2021/0303033 A1 * | 9/2021 | Hong | .................... | G06F 1/1641 |
| 2021/0307186 A1 * | 9/2021 | Hong | ..................... | F16C 11/12 |
| 2021/0368032 A1 * | 11/2021 | Liao | ...................... | G06F 1/1681 |
| 2022/0120124 A1 * | 4/2022 | Quynh | ................... | E05D 3/122 |
| 2024/0015909 A1 * | 1/2024 | Peng | .................... | H05K 5/0226 |
| 2024/0385659 A1 * | 11/2024 | Wu | ........................... | G06F 1/16 |

* cited by examiner

FOLDABLE-SCREEN DEVICE AND HINGE COMPONENT

CROSS-REFERENCE TO RELATED APPLICATIONS

This application is a National Stage of International Application No. PCT/CN2022/111316 filed on Aug. 10, 2022, which claims priority to Chinese Patent Application No. 202111163981.8 filed on Sep. 30, 2021. Both of the aforementioned applications are hereby incorporated by reference in their entireties.

TECHNICAL FIELD

Embodiments of this application relate to the field of terminal technologies, and in particular, to a foldable-screen device and a hinge component.

BACKGROUND

With continuous development of mobile devices such as a mobile phone, a user has an increasingly strong requirement for a large-screen mobile phone. In addition, with development of a flexible screen technology, a foldable-screen device based on a flexible screen, for example, a foldable-screen mobile phone, has become an emerging product in a current industry. To meet differentiated requirements of different users, various foldable mobile phones with an inward foldable-screen or an outward foldable-screen emerge.

Currently, the foldable-screen device, for example, the foldable-screen mobile phone, commonly includes the flexible screen, a hinge component, and two framing members. The two framing members are connected by the hinge component, and the flexible screen is bonded to inner surfaces of the hinge component and the two framing members. The hinge component includes a primary shaft mechanism and rotation mechanisms located on two sides of the primary shaft mechanism. One end of the rotation mechanism is connected to a corresponding framing member, and another end of the rotation mechanism is rotatably connected to the primary shaft mechanism. In this way, the rotation mechanism may drive the corresponding framing member to rotate, so that the two framing members drive the flexible screen to switch freely between a flattened state and a folded state.

However, when the hinge component rotates to a flattened state, the flexible screen located on the hinge component is extremely easy to arch at a joint between the rotation mechanism and the primary shaft mechanism, affecting flatness of the flexible screen of the foldable-screen device in the flattened state.

SUMMARY

Embodiments of this application provide a foldable-screen device and a hinge component, to resolve a problem that a flexible screen is arched at a joint between a rotation mechanism and a primary shaft mechanism when the hinge component is in a flattened state, so that flatness of the flexible screen of the foldable-screen device in a flattened state is ensured.

An embodiment of this application provides a foldable-screen device, including a flexible screen, two framing members, and a hinge component located between the two framing members, where the flexible screen is located on a surface of a same side of the two framing members and the hinge component.

The hinge component includes a primary shaft mechanism and two rotation mechanisms that are located on two sides of the primary shaft mechanism and that are rotatably connected to the primary shaft mechanism. Each rotation mechanism includes a support member, a first end of the support member is rotatable around the primary shaft mechanism, a second end of the support member is connected to a corresponding framing member, and a part of the flexible screen is connected to a surface of one side of the support member.

An elastic component is disposed on the support member, a first end of the elastic component is used to press against the primary shaft mechanism when the rotation mechanism rotates to a flattened state, a second end of the elastic component is connected to the support member, and a compression rate of the elastic component when the rotation mechanism rotates to the flattened state is greater than a compression rate of the elastic component when the rotation mechanism rotates to a folded state. In this way, when the rotation mechanism rotates to the flattened state, the elastic component generates a spring force, and when a user releases or reduces an active force applied to a framing member on one side of the support member in a flattened direction, the second end of the elastic component can drive the support member to move far away from the primary shaft mechanism, to directly drive the flexible screen on the support member to be flattened in a direction far away from the primary shaft mechanism. In addition, the framing member at the second end of the support member also moves far away from the primary shaft mechanism under driving of the support member, so that the flexible screen on the framing member is flattened in the direction far away from the primary shaft mechanism. This avoids a case in which the flexible screen is arched at a joint between the rotation mechanism and the primary shaft mechanism when the hinge component is in a flattened state, ensures flatness of the flexible screen of the foldable-screen device in a flattened state, improves display performance of the foldable-screen device, and also improves a lifespan of the flexible screen.

In an optional implementation, the support member has an installation channel, and one side that is of the installation channel and that faces the primary shaft mechanism has a first opening.

At least a part of the elastic component is accommodated in the installation channel, the second end of the elastic component presses against an inner wall of the installation channel, and the first end of the elastic component presses against the primary shaft mechanism through the first opening.

In this embodiment of this application, the installation channel is disposed on the support member, and the at least a part of the elastic component is accommodated in the installation channel, to improve structural stability of the elastic component on the support member, so that driving of the elastic component to the support member is more reliable.

In an optional implementation, the elastic component includes an elastic member and a push block.

The elastic component includes the elastic member and the push block.

A first end of the push block extends out to an outside of the first opening, and cooperates with the primary shaft mechanism. A second end of the push block presses against the first end of the elastic component, and the second end of the elastic component presses against the inner wall of the installation channel. In this way, when the rotation mechanism rotates to the flattened state, the primary shaft mechanism extrudes the push block, so that the elastic member is in a compressed state. When a force applied to another end of the support member is less than the spring force of the elastic member, the support member may move far away from the primary shaft mechanism under the spring force, so that the flexible screen is flattened.

In an optional implementation, the primary shaft mechanism has a holding part, and the holding part is located on a side wall that is of the primary shaft mechanism and that faces the push block.

When the support member rotates to a flattened state, at least a part of a surface of the first end of the push block is supported on the holding part. In this way, it can be ensured that, when being extruded by the primary shaft mechanism, the push block can stably press against the side wall of the primary shaft mechanism, and does not slide downward along the side wall of the primary shaft mechanism (in a direction towards the flexible screen). This further ensures that the support member moves along the flattened direction of the hinge component under driving of the push block and the elastic member.

In an optional implementation, the holding part includes a free end and a constraint end that are disposed opposite to each other along an axial direction perpendicular to the primary shaft mechanism.

The constraint end is close to an axial line of the primary shaft mechanism, the free end is far away from the axial line of the primary shaft mechanism, and a distance between the free end and an outer surface of the primary shaft mechanism is less than a distance between the constraint end and the outer surface of the primary shaft mechanism.

In this embodiment of this application, the distance between the free end of the holding part and the outer surface of the primary shaft mechanism is set to be greater than the distance between the constraint end and the outer surface of the primary shaft mechanism, that is, the free end of the holding part is lower than the constraint end, so that the holding part is disposed inclinedly towards the push block. In this way, when the first end of the push block is supported on the holding part, the holding part has a component force on the push block in the flattened direction. This increases an active force applied by the primary shaft mechanism to the push block in the flattened direction, and ensures that the spring force generated by compressing the elastic member can stably drive the support member to move far away from the primary shaft mechanism.

In an optional implementation, at least a part of a surface that is of the holding part and that faces the push block is an arc surface, and the at least a part of the surface of the first end of the push block is an arc surface cooperating with the arc surface, so that the first end of the push block can well avoid the holding part in a rotation process without affecting stability of the push block in the installation channel.

In an optional implementation, the side wall that is of the primary shaft mechanism and that faces the push block further has a reinforcement part, and the constraint end of the holding part is connected to the reinforcement part.

A part of the surface of the first end of the push block cooperates with the reinforcement part.

In this embodiment of this application, the reinforcement part is disposed on the side wall that is of the primary shaft mechanism and that faces the push block, to improve mechanical strength of the side wall of the primary shaft mechanism, ensure that the side wall of the primary shaft mechanism is not damaged in a long-term pressing process against the first end of the push block is ensured, and prolong a lifespan of the primary shaft mechanism.

In an optional implementation, the push block has a support part, and the support part is located on one side that is of the push block and that faces the flexible screen.

The support part is supported on a surface of the support member.

In this embodiment of this application, the support part is disposed on the one side that is of the push block and that faces the flexible screen, and the support part is supported on the support member, so that the first end of the push block can move along the surface of the support member when being extruded by the primary shaft mechanism. In particular, when a part of the first end of the push block is supported on the holding part of the primary shaft mechanism, the push block moves stably along the surface of the support member through the support part. This ensures that the push block moves stably in the flattened direction without an up-down shift, so that the elastic member is compressed to a greater extent, and drives the support member to move far away from the primary shaft mechanism.

In an optional implementation, the support member has a sliding slot, and at least a part of the sliding slot is disposed between the first opening and the primary shaft mechanism.

The support part is slidably disposed in the sliding slot.

In this embodiment of this application, the support part is slidably disposed in the sliding slot disposed on the support member, so that a moving path of the support part on the support member is limited, and that the support part stably moves in the flattened direction is ensured. This ensures that the push block can compress the elastic member along the flattened direction, and that the spring force generated by compressing the elastic member can stably drive the support member to move.

In an optional implementation, the push block includes a main part and at least one connection part.

One end of the main part is connected to the connection part, another end of the main part cooperates with the primary shaft mechanism, the support part of the push block is located on the main part, and at least a part of the elastic member is sleeved on the connection part, to improve stability of the elastic member on the push block, so that the elastic member can be stably compressed or stretched along the connection part.

In an optional implementation, the inner wall of the installation channel has a pressing part, and a second end of the elastic member presses against one side that is of the pressing part and that faces the first opening.

One end that is of the installation channel and that faces away from the primary shaft mechanism has a second opening, and the connection part movably penetrates the second opening.

In this embodiment of this application, the second end of the elastic member presses against the pressing part in the installation channel, to improve pressing stability of the second end of the elastic member against the support member. In addition, the second opening is disposed at the one end that is of the installation channel and that faces away from the primary shaft mechanism, so that the connection part movably penetrates the second opening. This ensures that the push block can move freely in the installation channel under an extrusion of the primary shaft mechanism, and the elastic member can be sleeved on the connection part to a larger extent, to ensure that the elastic member is stably compressed or stretched in a moving direction of the push block.

In an optional implementation, the pressing part is disposed along a circumferential direction of the installation channel, and one end that is of the pressing part and that faces away from the inner wall of the installation channel encloses the second opening, so that a manufacturing process of the second opening is simplified, to improve manufacturing efficiency of the support member.

In an optional implementation, the elastic component further includes a positioning member.

The positioning member is sleeved on one end that is of the connection part and that faces away from the main part, at least a part of the elastic member is located between the main part and the positioning member, and the positioning member is located on one side that is of the pressing part and that faces away from the first opening, to ensure that the push block is not detached from the installation channel from the first opening in any state, and ensure stability of the push block in the installation channel.

In an optional implementation, there are two connection parts, and at least two connection parts are disposed at one end of the main part at an interval.

There are two elastic members, and each elastic member is sleeved on a corresponding connection part.

In this embodiment of this application, the two connection parts are disposed at the one end of the main part at the interval, and the elastic member is sleeved on each connection part, so that the main part simultaneously compresses the two elastic members. This ensures that the support member moves stably along a spring force direction under an action of the two elastic members, to drive the support member to move stably in the flattened direction.

In an optional implementation, the installation channel has an isolation part, and the isolation part separates the installation channel into two sub-channels.

The two sub-channels are disposed side by side along a direction parallel to the axial line of the primary shaft mechanism, and at least a part of each of the two connection parts is disposed in a corresponding sub-channel, to further ensure that each connection part and the elastic member on the connection part move stably along the corresponding sub-channel. This avoids a left-right shift of each connection part in a direction perpendicular to the flattened direction, and avoids interference when the two connection parts and the elastic members on the two connection parts move.

In an optional implementation, each rotation mechanism further includes a plurality of swing arms.

A first end of each swing arm is rotatably connected to the primary shaft mechanism, a second end of each swing arm is connected to a corresponding framing member, all the swing arms and the elastic component are located on a same side of the support member, and each swing arm is connected to the support member. In addition, a position at which the first end of the swing arm rotates around and cooperates with the primary shaft mechanism has a movement gap, to enable the swing arm to be driven to move far away from the primary shaft mechanism when the support member moves far away from the primary shaft mechanism, so that the framing member at one end of the swing arm is driven to move far away from the primary shaft mechanism. This further ensures that the flexible screen is flattened under driving of the framing member and the rotation mechanism.

In an optional implementation, each rotation mechanism further includes a plurality of housing connecting rods, all the housing connecting rods are located on the support member, and the plurality of housing connecting rods and the plurality of swing arms are disposed in a one-to-one correspondence.

The second end of the swing arm is rotatably connected to the housing connecting rod, and each housing connecting rod is connected to the support member, to enable the housing connecting rod to be driven to move far away from the primary shaft mechanism when the support member moves far away from the primary shaft mechanism. In addition, the housing connecting rod is connected to a corresponding framing member, so that the housing connecting rod drives the framing member to move far away from the primary shaft mechanism when the rotation mechanism rotates to the flattened state. This ensures that the flexible screen is flattened.

An embodiment of this application further provides a hinge component, including a primary shaft mechanism and two rotation mechanisms that are located on two sides of the primary shaft mechanism and that are rotatably connected to the primary shaft mechanism. Each rotation mechanism includes a support member, a first end of the support member is rotatable around the primary shaft mechanism, a second end of the support member is connected to a framing member of a foldable-screen device, and a part of a flexible screen is connected to a surface of one side of the support member.

An elastic component is disposed on the support member, a first end of the elastic component is used to press against the primary shaft mechanism when the rotation mechanism rotates to a flattened state, a second end of the elastic component is connected to the support member, and a compression rate of the elastic component when the rotation mechanism rotates to the flattened state is greater than a compression rate of the elastic component when the rotation mechanism rotates to a folded state. In this way, when the rotation mechanism rotates to the flattened state, the elastic component generates a spring force, and when a user releases or reduces an active force applied to the framing member on one side of the support member in a flattened direction, the second end of the elastic component can drive the support member to move far away from the primary shaft mechanism, to directly drive the flexible screen on the support member to be flattened in a direction far away from the primary shaft mechanism. In addition, the framing member at the second end of the support member also moves far away from the primary shaft mechanism under driving of the support member, so that the flexible screen on the framing member is flattened in the direction far away from the primary shaft mechanism. This avoids a case in which the flexible screen is arched at a joint between the rotation mechanism and the primary shaft mechanism when the hinge component is in a flattened state, and ensures flatness of the flexible screen of the foldable-screen device in a flattened state.

DESCRIPTIONS OF REFERENCE NUMERALS

10—flexible screen; 20—framing member; 30—hinge component; 40—battery cover; 10a—external screen; 11—first display region; 12—second display region; 13—third display region; 21—first framing member; 22—second framing member; 31—primary shaft mechanism; 32—rotation mechanism; 32a—connection member; 33—elastic component; 211—first metal median plate; 212—first frame; 221—second metal median plate; 222—second frame; 31a—second main surface; 311—holding part; 312—reinforcement part; 321—support member; 322—swing arm; 323—housing connecting rod; 324—installation channel; 331—elastic member; 332—push block; 333—positioning member; 311a—holding surface; 321a—installation part; 321b—pressing part; 321c—isolation part; 3211—first surface; 3212—second surface; 3213—sliding slot; 324a—first opening; 324b—second opening; 3241—first sub-channel; 3242—second sub-channel; 332a—support part; 3321—main part; 3322—connection part;

3212a—first main surface; 3212b—installation surface; 3213a—first sliding slot; 3213b—second sliding slot; 3322a—first connection part; 3322b—second connection part; and 3322c—installation slot.

DESCRIPTION OF EMBODIMENTS

Some terms used in embodiments of this application are only used to explain specific embodiments of this application, but are not intended to limit this application.

Embodiments of this application provide a foldable-screen device. It may be understood that the foldable-screen device provided in embodiments of this application may include but is not limited to a foldable fixed terminal or mobile terminal such as a mobile phone, a tablet computer, a notebook computer, an ultra-mobile personal computer (ultra-mobile personal computer, UMPC), a handheld computer, a touch television, a walkie-talkie, a netbook, a POS terminal, a personal digital assistant (personal digital assistant, PDA), a wearable device, or a virtual reality device.

Figure 1:
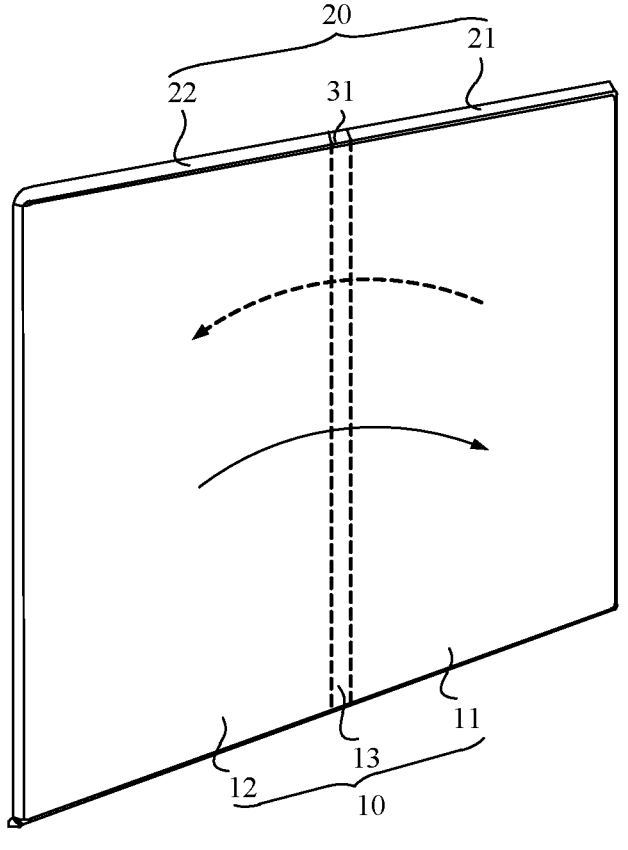
FIG. 1 is a schematic diagram of a structure of a foldable-screen device in a flattened state according to an embodiment of this application.
Figure 2:
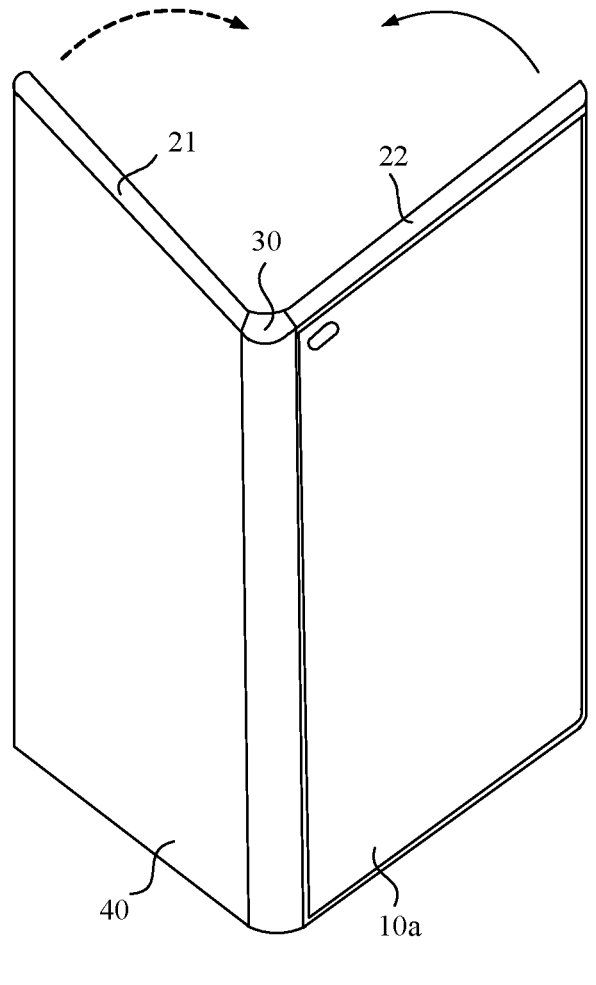
FIG. 2 is a schematic diagram of a structure of a foldable-screen device in a half-folded state according to an embodiment of this application.
Figure 3:
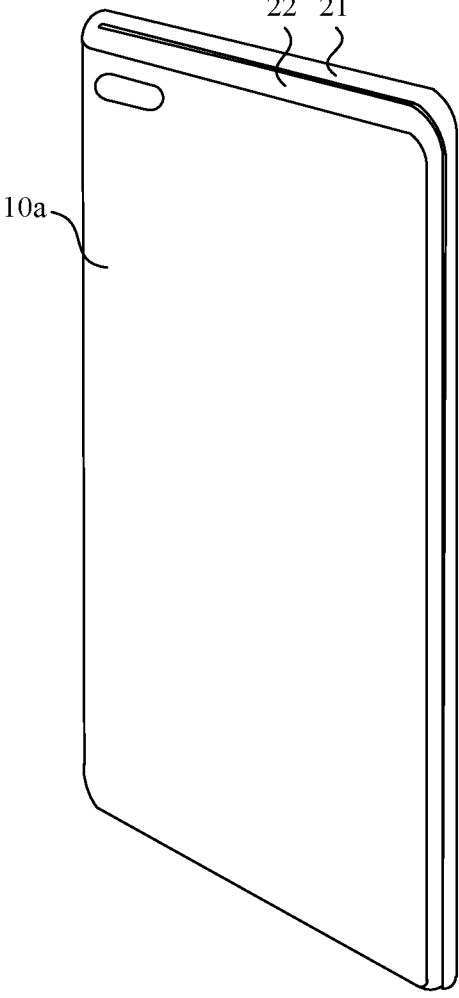
FIG. 3 is a schematic diagram of a structure of a foldable-screen device in a folded state according to an embodiment of this application.

FIG. 1 is a schematic diagram of a structure of a foldable-screen device in a flattened state according to an embodiment of this application, FIG. 2 is a schematic diagram of a structure of the foldable-screen device in a half-folded state according to an embodiment of this application, and FIG. 3 is a schematic diagram of a structure of the foldable-screen device in a folded state according to an embodiment of this application. As shown in FIG. 1 to FIG. 3, in this embodiment of this application, a foldable-screen mobile phone is used as an example to describe a structure of the foldable-screen device. The foldable-screen mobile phone may be an inward foldable-screen mobile phone. Certainly, in some examples, the foldable-screen mobile phone may alternatively be an outward foldable-screen mobile phone.

Figure 5:
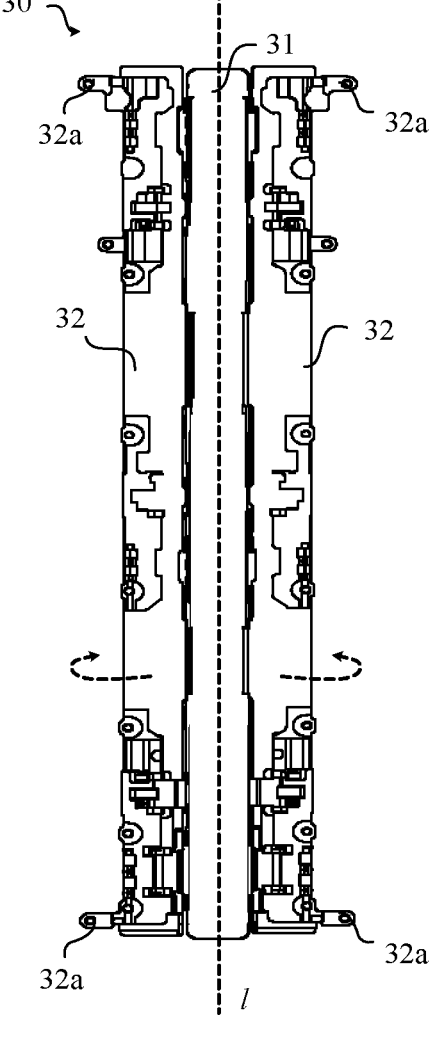
FIG. 5 is a schematic diagram of a structure of a hinge component in a flattened state in a foldable-screen device according to an embodiment of this application.

As shown in FIG. 1, the foldable-screen mobile phone may include at least two framing members 20 and a hinge component 30 located between the two framing members 20. The two framing members 20 may be respectively a first framing member 21 and a second framing member 22. The first framing member 21 and the second framing member 22 are respectively located on two sides of the hinge component 30, and the first framing member 21 and the second framing member 22 are respectively fastened to the hinge component 30. The first framing member 21 and the second framing member 22 are respectively fastened to connection members 32a (as shown in FIG. 5) of the hinge component 30.

It should be noted that, the first framing member 21 and the second framing member 22 may be respectively fastened to the connection members 32a by welding, bonding, screw fastening, or the like.

As shown in FIG. 1, the first framing member 21 and the second framing member 22 can be unfolded relative to each other to an open state (also referred to as a flattened state), so that the foldable-screen mobile phone is in an open state (also referred to as a flattened state). For example, when the first framing member 21 and the second framing member 22 are in the flattened state, an included angle between the first framing member 21 and the second framing member 22 may be approximately 180° (where a slight deviation is also allowed, for example, the included angle is 165°, 177°, or 185°).

As shown in FIG. 3, the first framing member 21 and the second framing member 22 can be folded relative to each other to a closed state (also referred to as a folded state), so that the foldable-screen mobile phone is in a folded state. For example, when the first framing member 21 and the second framing member 22 are in the folded state, the first framing member 21 and the second framing member 22 can be completely folded to be parallel to each other (where a small deviation is also allowed).

An intermediate state (also referred to as the half-folded state) shown in FIG. 2 may be any state between the flattened state and the folded state. Therefore, the foldable-screen mobile phone may switch between the flattened state and the folded state through moving of the hinge component 30.

It should be noted that there may be one first framing member 21 and one second framing member 22, so that the foldable-screen mobile phone may be folded into two layers. For example, as shown in FIG. 1, the foldable-screen mobile phone may include one first framing member 21, one second framing member 22, and the hinge component 30 used to connect the first framing member 21 and the second framing member 22, and the first framing member 21 and the second framing member 22 rotate relative to each other to be stacked, so that the foldable-screen device is in a two-layer form.

Alternatively, there may be a plurality of first framing members 21 and a plurality of second framing members 22, and the first framing member 21 and the second framing member 22 that are adjacent to each other are connected by using the hinge component 30, so that the foldable-screen device may be folded into a plurality of layers. For example, the foldable-screen device may include two second framing members 22, one first framing member 21, and two hinge components 30. The two second framing members 22 are located on two sides of the first framing member 21, and are respectively rotatably connected to the first framing member 21 by using the hinge components 30. One second framing member 22 and the first framing member 21 may rotate relative to each other to be stacked, and the other second framing member 22 may also rotate relative to the first framing member 21 to be stacked, so that the foldable-screen device is in a three-layer folded form. The foldable-screen device is in the flattened state when two of the first framing member 21 and the second framing members 22 are rotated to a same plane.

As shown in FIG. 1, in actual application, the foldable-screen device may further include a foldable flexible screen 10. The flexible screen 10 is disposed on a surface of a same side of the hinge component 30, the first framing member 21, and the second framing member 22. When the first framing member 21 and the second framing member 22 are folded, the flexible screen 10 is bent and attached between the first framing member 21 and the second framing member 22. When the first framing member 21 and the second framing member 22 are unfolded, the flexible screen 10 is also unfolded. For the inward foldable-screen mobile phone, the flexible screen 10 is disposed on inner surfaces of the hinge component 30, the first framing member 21, and the second framing member 22. For the outward foldable-screen mobile phone, the flexible screen 10 is disposed on outer surfaces of the hinge component 30, the first framing member 21, and the second framing member 22.

It should be noted that the inner surfaces of the hinge component 30, the first framing member 21, and the second framing member 22 are surfaces of the hinge component 30, the first framing member 21, and the second framing member 22 facing a folded direction. In other words, when the foldable-screen mobile phone is in the folded state or the half-folded state, surfaces of the first framing member 21 and the second framing member 22 facing each other are the inner surfaces. In this case, a surface on a same side of the inner surfaces of the first framing member 21 and the second framing member 22 and the hinge component 30 is the inner surface of the hinge component 30.

On the contrary, the outer surfaces of the hinge component 30, the first framing member 21, and the second framing member 22 are surfaces of the hinge component 30, the first framing member 21, and the second framing member 22 facing an unfolded direction. In other words, when the foldable-screen mobile phone is in the folded state or the half-folded state, surfaces of the first framing member 21 and the second framing member 22 facing away from each other are the outer surfaces. In this case, a surface that is on a same side of the outer surfaces of the first framing member 21 and the second framing member 22 and the hinge component 30 is the outer surface of the hinge component 30.

In actual application, the flexible screen 10 may be bonded to the inner surfaces of the hinge component 30, the first framing member 21, and the second framing member 22, to ensure that a part of the flexible screen 10 stably covers the inner surface of the hinge component 30, and improve stability of the flexible screen 10 in the foldable-screen device.

As shown in FIG. 1, the flexible screen 10 may include a first display region 11, a second display region 12, and a third display region 13 located between the first display region 11 and the second display region 12. The first display region 11 may be located on the inner surface of the first framing member 21, the second display region 12 may be located on the inner surface of the second framing member 22, and the third display region 13 is located on the inner surface of the hinge component 30.

Certainly, in some embodiments, the foldable-screen device may alternatively be a notebook computer, and the notebook computer may also include the first framing member 21 and the second framing member 22. The first framing member 21 and the second framing member 22 can rotate facing each other to be stacked on each other, so that the notebook computer is in a folded state. On the contrary, when the first framing member 21 and the second framing member 22 rotate facing away from each other from a stacked state until the first framing member 21 and the second framing member 22 cannot rotate, the notebook computer is in a flattened state. In the flattened state, a part of the foldable flexible screen 10 on the first framing member 21 may be used to display an image or the like, and a part of the foldable flexible screen 10 on the second framing member 22 may be used as a virtual keyboard.

As shown in FIG. 2 and FIG. 3, the foldable-screen device may further include an external screen 10a. The external screen 10a and the flexible screen 10 may be respectively located on two sides of the first framing member 21 or the second framing member 22. For example, as shown in FIG. 2, the external screen 10a is relative to the second display region 12 of the flexible screen 10, and the external screen 10a and the second display region 12 of the flexible screen 10 are respectively located on the two sides of the second framing member 22. In this case, as shown in FIG. 3, when the foldable-screen device is in the folded state, the external screen 10a is located on an outer surface of the foldable-screen device, and may be used independently. Certainly, in some examples, the external screen 10a may not be disposed.

In this embodiment of this application, as shown in FIG. 2, a battery cover 40 may be further included. The battery cover 40 and the first display region 11 of the flexible screen 10 may be respectively located on the two sides of the first framing member 21.

Figure 4:
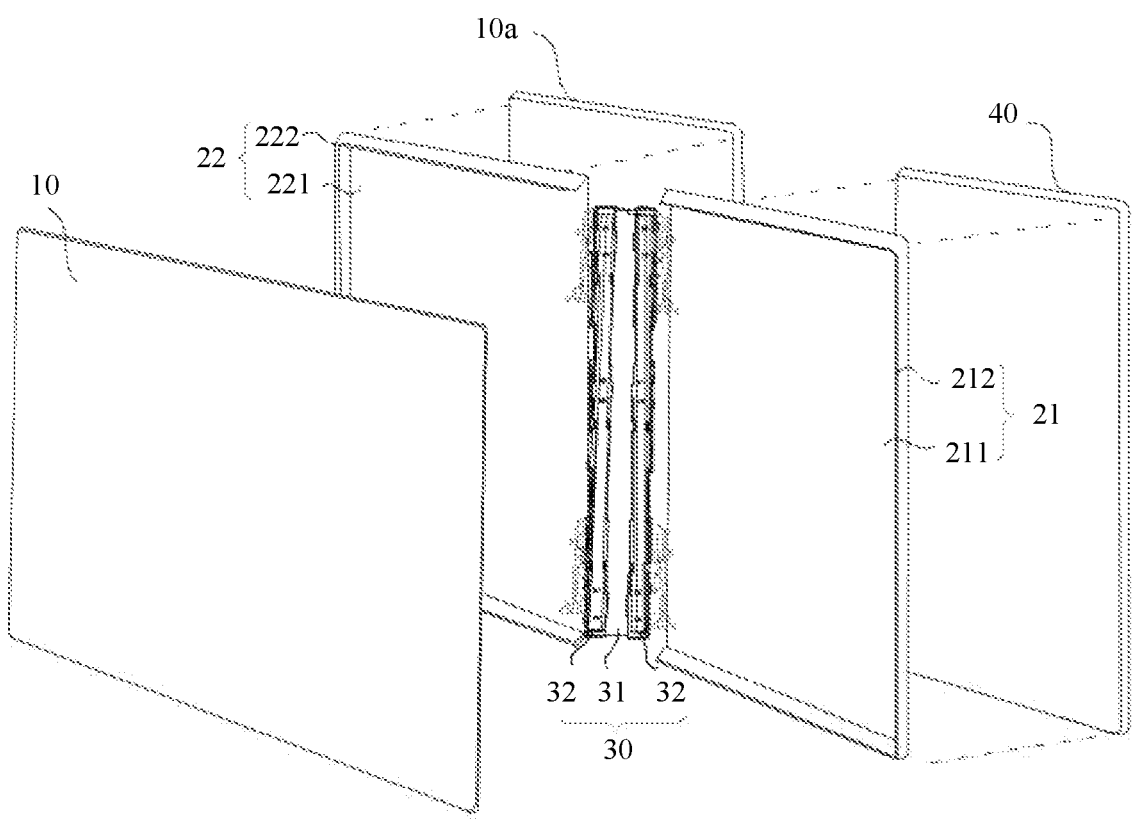
FIG. 4 is an exploded schematic diagram of a structure of a foldable-screen device according to an embodiment of this application.

FIG. 4 is an exploded schematic diagram of a structure of a foldable-screen device according to an embodiment of this application. As shown in FIG. 4, a first framing member 21 and a second framing member 22 may be middle frames. The first framing member 21 may include a first metal median plate 211 and a first frame 212 disposed around an outer edge of the first metal median plate 211. The second framing member 22 may include a second metal median plate 221 and a second frame 222 disposed around an outer edge of the second metal median plate 221. A hinge component 30 is separately fastened to the first metal median plate 211 and the second metal median plate 221.

FIG. 5 is a schematic diagram of a structure of the hinge component in a flattened state in the foldable-screen device according to an embodiment of this application. As shown in FIG. 5, a hinge component 30 includes a primary shaft mechanism 31 and two rotation mechanisms 32 that are located on two sides of the primary shaft mechanism 31 and that are rotatably connected to the primary shaft mechanism 31. As shown in FIG. 5, the two rotation mechanisms 32 may be symmetrically disposed relative to the primary shaft mechanism 31. The two rotation mechanisms 32 may rotate relative to the primary shaft mechanism 31 along two dotted arrows in FIG. 5.

Figure 6:
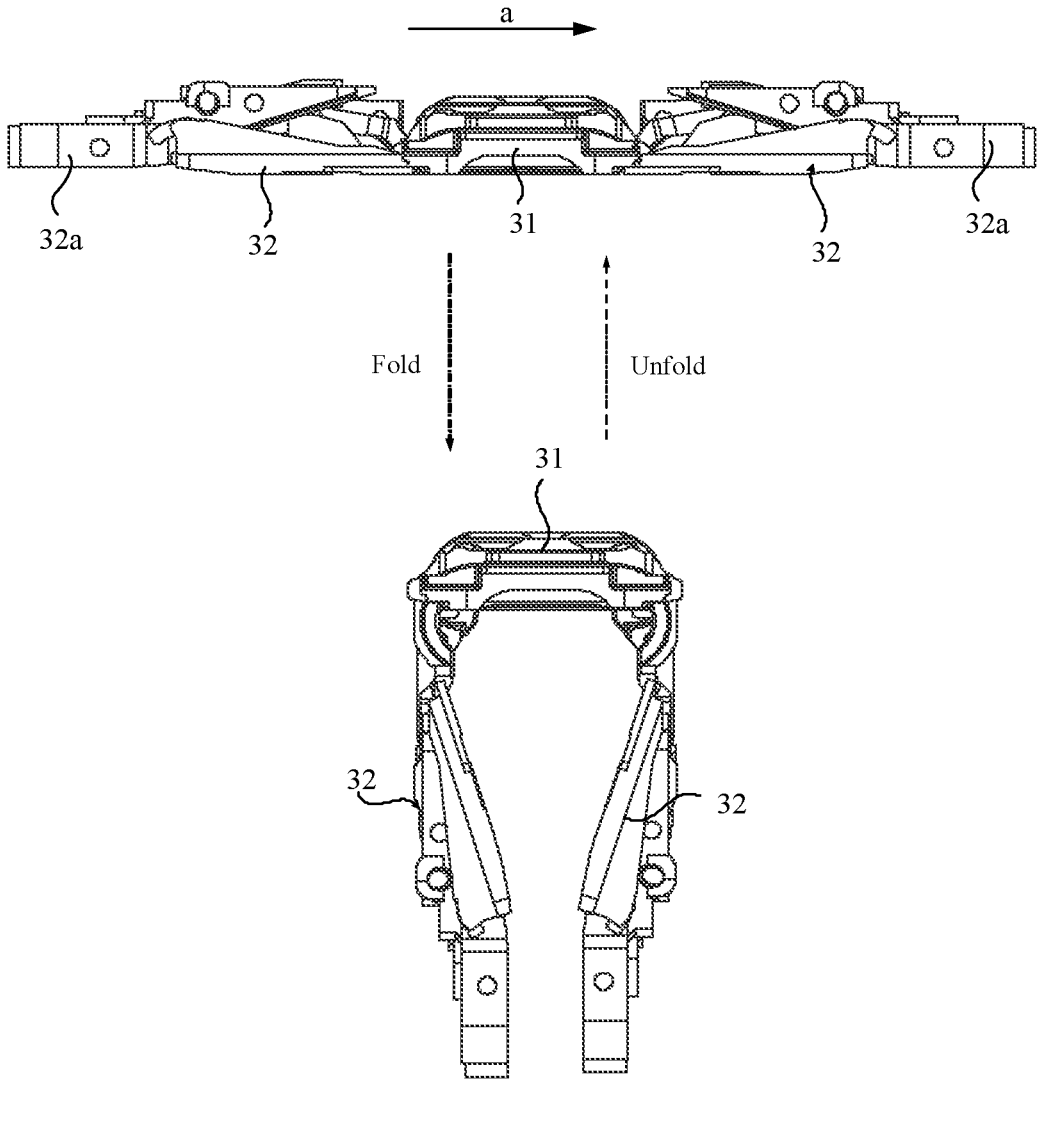
FIG. 6 is a side view of switching between a flattened state and a folded state of a hinge component in a foldable-screen device according to an embodiment of this application.

FIG. 6 is a side view of switching between the flattened state and a folded state of the hinge component in the foldable-screen device according to an embodiment of this application. For example, as shown in FIG. 6, when two rotation mechanisms 32 are in a folded state, the two rotation mechanisms 32 may face each other, and when the two rotation mechanisms 32 are in a flattened state, the two rotation mechanisms 32 are opposite to each other relative to a primary shaft mechanism 31. In other words, the two rotation mechanisms 32 and the primary shaft mechanism 31 are both in a flattened direction (refer to a direction shown by an arrow a in FIG. 6).

It should be noted that the flattened direction is a width direction of the hinge component 30 when the rotation mechanism 32 rotates to the flattened state.

As shown in FIG. 4 and FIG. 5, during specific assembly, one end that is of the rotation mechanism 32 and that faces away from the primary shaft mechanism 31 is connected to a corresponding framing member 20. For example, one rotation mechanism 32 is connected to the first framing member 21 by using a connection member 32a, and the other rotation mechanism 32 is connected to the second framing member 22 by using the connection member 32a. In this way, the two rotation mechanisms 32 may respectively drive the first framing member 21 and the second framing member 22 to fold or unfold, so that a flexible screen 10 on surfaces of the two framing members 20 and the hinge component 30a switches freely between a flattened state and a folded state.

As shown in FIG. 6, a joint (that is, a bending region of the hinge component 30) between the rotation mechanism 32 and the primary shaft mechanism 31 has a displacement difference in a folded state and a flattened state. In this case, after the flexible screen 10 is bent for a long time, a case of wrinkles such as arching extremely occurs on the flexible screen 10 at the joint between the rotation mechanism 32 and the primary shaft mechanism 31 when the hinge component 30 is in the flattened state, further affecting flatness of the flexible screen 10 of the foldable-screen device in the flattened state.

Therefore, the hinge component 30 is provided in embodiments of this application. An elastic component 33 is disposed on a support member 321 of the rotation mechanism 32, when the rotation mechanism rotates to the flattened state, a first end of the elastic component 33 presses against the primary shaft mechanism 31, a second end of the elastic component 33 is connected to the support member 321, and a compression rate of the elastic component 33 when the rotation mechanism 32 rotates to the flattened state is greater than a compression rate when the rotation mechanism 32 rotates to a folded state. In this way, when the rotation mechanism 32 rotates to the flattened state, the elastic component 33 generates a spring force, and when a user releases or reduces an active force applied to the framing member 20 on one side of the support member 321 in the flattened direction, the second end of the elastic component 33 can drive the support member 321 to move far away from the primary shaft mechanism 31. In this way, the support member 321 can directly drive the flexible screen 10 on one side of the support member 321 to be flattened in a direction far away from the primary shaft mechanism 31. This avoids a case in which the flexible screen 10 is arched at the joint between the rotation mechanism 32 and the primary shaft mechanism 31 when the hinge component 30 is in the flattened state, ensures the flatness of the flexible screen 10 of the foldable-screen device in the flattened state, improves display performance of the foldable-screen device, and also improves a lifespan of the flexible screen 10. The following describes a specific structure of the hinge component 30 in embodiments of this application.

Figure 7:
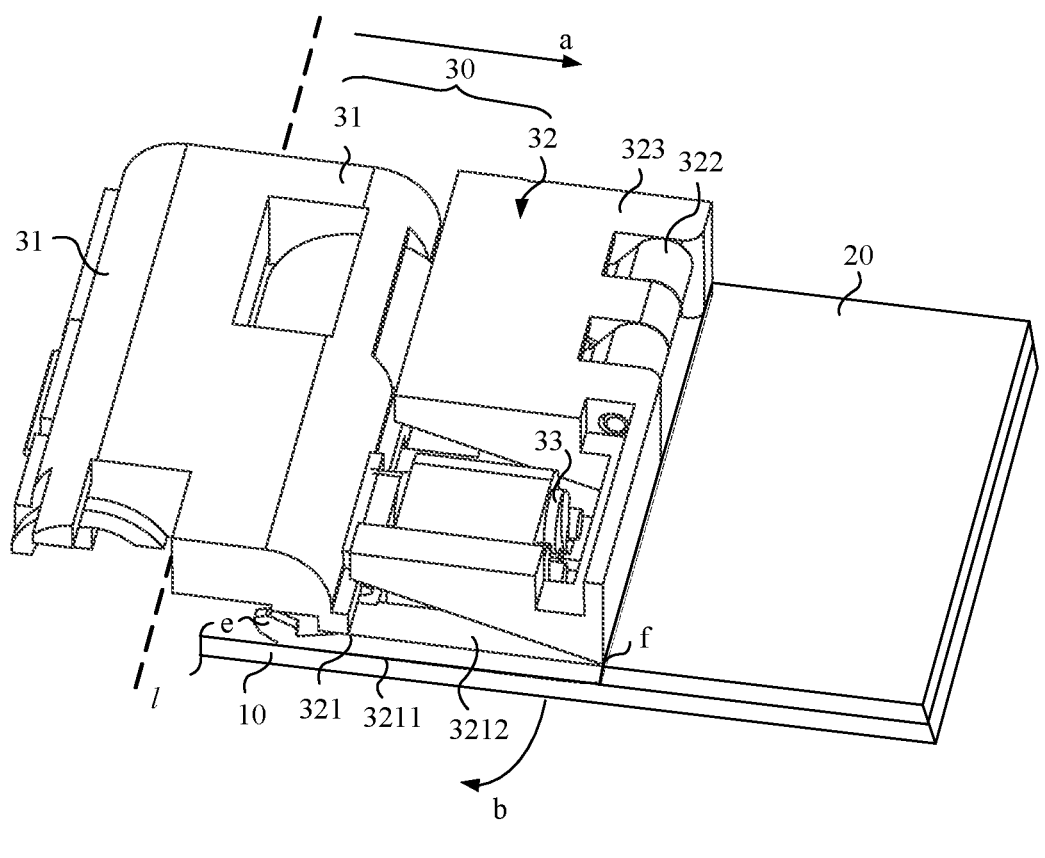
FIG. 7 is a schematic diagram of a part of a structure of one type of a hinge component in a flattened state in a foldable-screen device according to an embodiment of this application.
Figure 8:
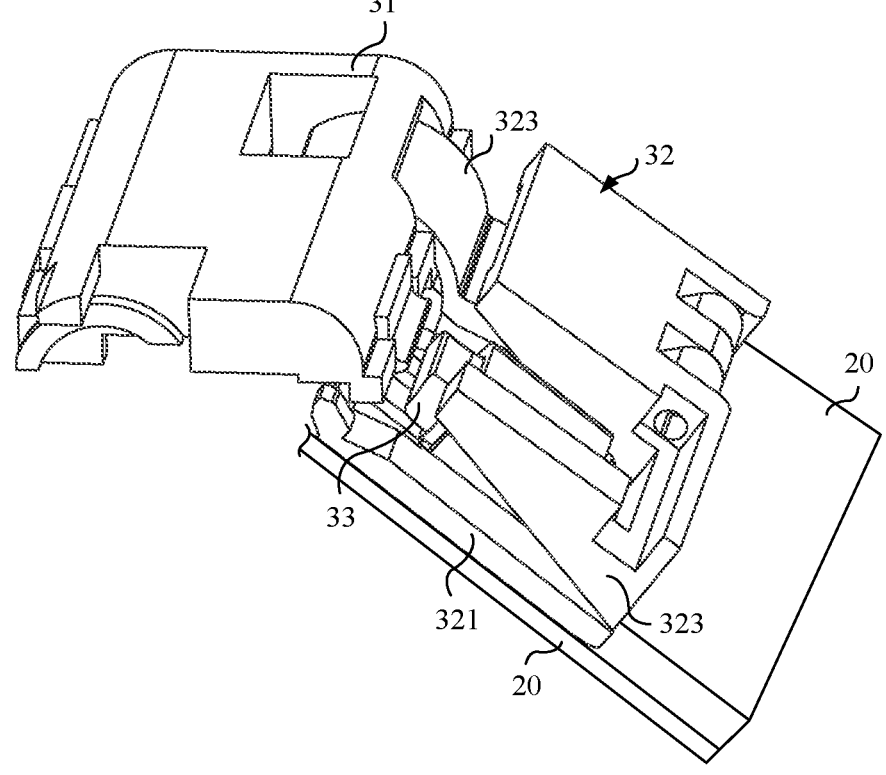
FIG. 8 is a schematic diagram of a part of a structure of a hinge component in a half-folded state in a foldable-screen device according to an embodiment of this application.
Figure 9:
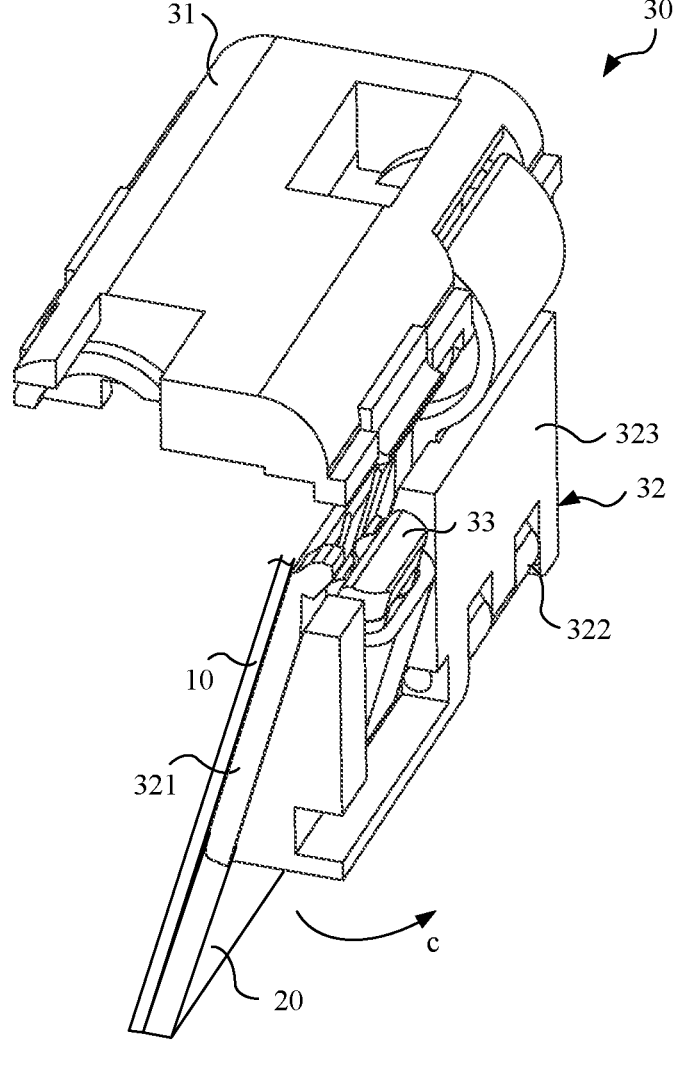
FIG. 9 is a schematic diagram of a part of a structure of a hinge component in a folded state in a foldable-screen device according to an embodiment of this application.

FIG. 7 is a schematic diagram of a part of a structure of one type of a hinge component in a flattened state in a foldable-screen device according to an embodiment of this application, FIG. 8 is a schematic diagram of a part of a structure of the hinge component in a half-folded state in the foldable-screen device according to an embodiment of this application, and FIG. 9 is a schematic diagram of a part of a structure of the hinge component in a folded state in the foldable-screen device according to an embodiment of this application.

As shown in FIG. 7, in the hinge component 30 provided in this embodiment of this application, each rotation mechanism 32 includes a support member 321, a first end (shown as e in FIG. 7) of the support member 321 may rotate around a primary shaft mechanism 31, and a second end (shown as f in FIG. 7) of the support member 321 is connected to a corresponding framing member 20. For example, a first end e of a support member 321 of one rotation mechanism 32 rotates around the primary shaft mechanism 31, and a second end f of the support member 321 is connected to a first framing member 21 (as shown in FIG. 4). A first end e of a support member 321 of another rotation mechanism 32 rotates around the primary shaft mechanism 31, and a second end f of the support member 321 is connected to a second framing member 22 (as shown in FIG. 4).

The support member 321 may also be referred to as a door plate in actual application. It may be understood that a part of a flexible screen 10 is disposed on one side of the support member 321 (as shown in FIG. 7). For example, a third display region 13 is located on inner surfaces of the support member 321 and the primary shaft mechanism 31. It should be noted that the inner surface of the support member 321 is a surface that is of the support member 321 and that faces a folded direction (refer to a direction shown by an arrow b in FIG. 7).

As shown in FIG. 7, the support member 321 includes a first surface 3211 and a second surface 3212 that are disposed facing away from each other. The first surface 3211 is the inner surface of the support member 321, the second surface 3212 is an outer surface of the support member 321, and a part of the flexible screen 10 (for example, the third display region 13) is connected to the first surface 3211 (for example, through glue line bonding).

As shown in FIG. 7, one support member 321 is located on a left side (not shown in the figure) of an axial line 1 of the primary shaft mechanism 31, the other support member 321 is located on a right side of the axial line 1 of the primary shaft mechanism 31, and the first end e of each support member 321 is rotatable around the primary shaft mechanism 31. Two support members 321 may rotate facing each other around the primary shaft mechanism 31 along the direction shown by the arrow b in FIG. 7, to fold relative to the primary shaft mechanism 31, as shown in FIG. 9, until the hinge component 30 is in the folded state.

When the support member 321 rotates around the primary shaft mechanism 31 along a direction shown by an arrow c in FIG. 9 until the support member 321 is in a flattened direction relative to the primary shaft mechanism 31, as shown in FIG. 7, the hinge component 30 is in the flattened state. A state of the hinge component 30 shown in FIG. 8 is between the flattened state and the folded state, that is, the half-folded state.

The second end f of the support member 321 of the rotation mechanism 32 is connected to a corresponding framing member 20. In this way, each support member 321 may drive the corresponding framing member 20 to rotate in a rotation process. For example, the support member 321 on one side of the primary shaft mechanism 31 drives the first framing member 21 to rotate, and the support member 321 on another side of the primary shaft mechanism 31 drives the second framing member 22 to rotate. In this way, when the support members 321 on the two sides rotate facing each other around the primary shaft mechanism 31, and the first framing member 21 and the second framing member 22 also rotate facing each other until inner surfaces of the support members 321 on the two sides face each other, the hinge component 30 drives the first framing member 21 and the second framing member 22 to be in a folded state, so that the flexible screen 10 on the hinge component 30 and the two framing members 20 is also bent to a folded state.

When the support members 321 on the two sides rotate facing away from each other around the primary shaft mechanism 31, the first framing member 21 and the second framing member 22 also rotate facing away from each other, until the support members 321 on the two sides are in the flattened direction, the hinge component 30 drives the first framing member 21 and the second framing member 22 to be in a flattened state, so that the flexible screen 10 on the hinge component 30 and the two framing members 20 is also unfolded to a flattened state.

It should be noted that, the second end f of the support member 321 of the rotation mechanism 32 may be directly connected to the corresponding framing member 20, or may be indirectly connected to the corresponding framing member 20. For example, the second end f of the support member 321 may be connected to the framing member 20 by using a housing connecting rod 323. A connection manner between the support member 321 and the corresponding framing member 20 is not specifically limited in this embodiment of this application, provided that it is ensured that the support member 321 can drive the framing member 20 connected to the support member 321 to rotate in a rotation process.

Figures 10, 11:
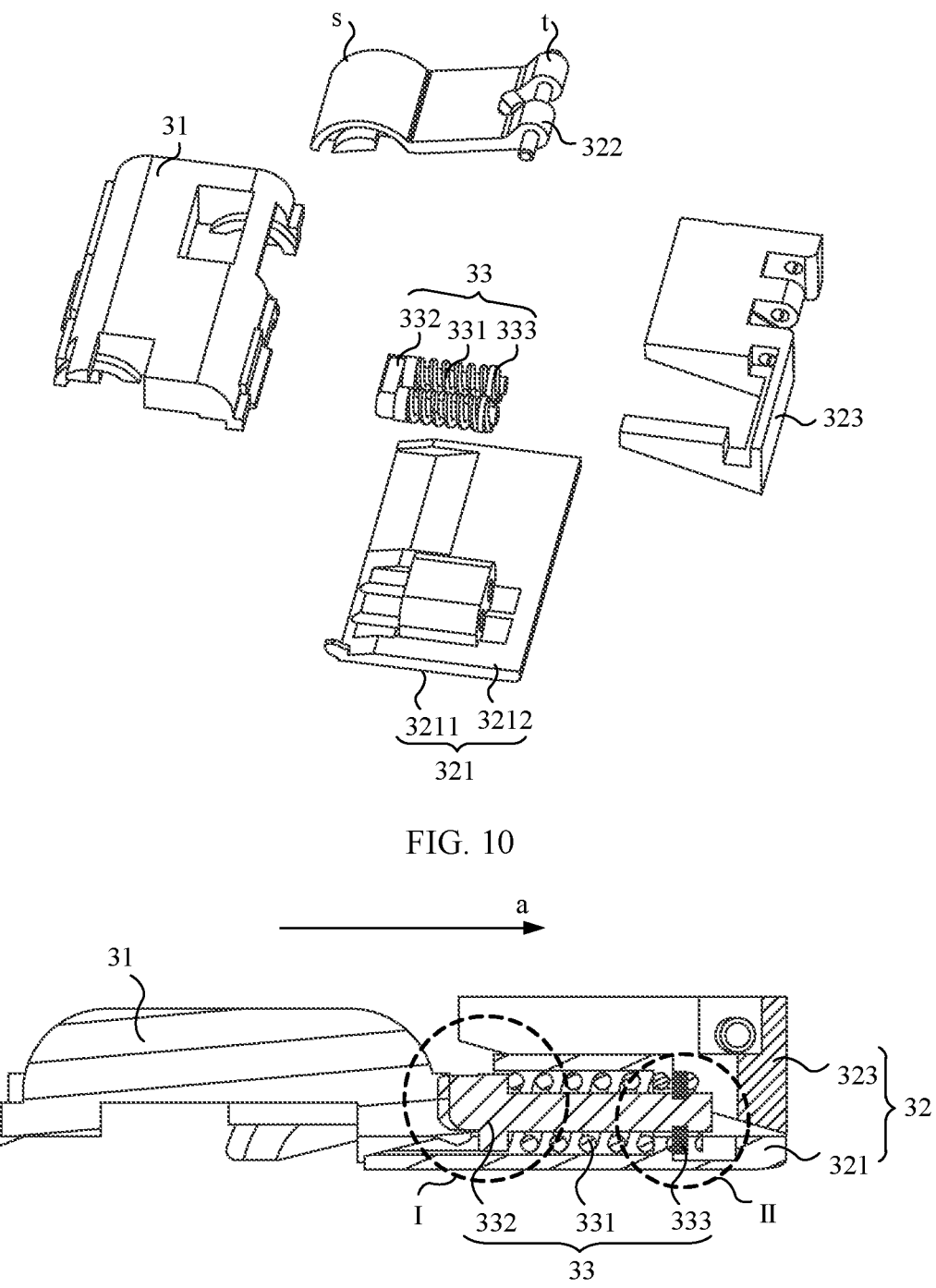
FIG. 10 is an exploded view of FIG. 7.
FIG. 11 is a sectional view of a part of a structure in FIG. 7.

FIG. 10 is an exploded view of FIG. 7, and FIG. 11 is a sectional view of a part of the structure in FIG. 7. As shown in FIG. 10, the hinge component 30 further includes an elastic component 33, and the elastic component 33 is disposed on the support member 321 (as shown in FIG. 7 and FIG. 11). The elastic component 33 and the flexible screen 10 are respectively disposed on surfaces of two sides of the support member 321 that are disposed facing away from each other. For example, the part of the flexible screen 10 is disposed on the first surface 3211 (that is, the inner surface) of the support member 321, and the elastic component 33 is disposed on the second surface 3212 (that is, the outer surface) of the support member 321 (as shown in FIG. 11).

As shown in FIG. 11, a first end of the elastic component 33 is used to press against the primary shaft mechanism 31 when the rotation mechanism 32 rotates to a flattened state. For example, the first end of the elastic component 33 presses against a side wall of the primary shaft mechanism 31, a second end of the elastic component 33 is connected to the support member 321, and the elastic component 33 is in a compressed state when the rotation mechanism 32 rotates to the flattened state.

In this embodiment of this application, the first end of the elastic component 33 presses against the side wall of the primary shaft mechanism 31 when the rotation mechanism 32 rotates to the flattened state. In some examples, when the rotation mechanism 32 is in the half-folded state (as shown in FIG. 8) or the folded state (as shown in FIG. 9), there may be no interference between the first end of the elastic component 33 and the side wall of the primary shaft mechanism 31. In other words, when the rotation mechanism 32 is in the folded state or the half-folded state, the elastic component 33 is in a natural state, and no active force is generated between the elastic component 33 and the support member 321.

In actual design, due to a reason of a common difference, in some examples, when the rotation mechanism 32 is in the half-folded state (as shown in FIG. 8) or the folded state (as shown in FIG. 9), interference occurs between the first end of the elastic component 33 and the side wall of the primary shaft mechanism 31. In other words, the primary shaft mechanism 31 has pressure on the elastic component 33, so that the elastic component 33 is in the compressed state.

It should be noted that, in this embodiment of this application, a compression rate of the elastic component 33 when the rotation mechanism 32 rotates to the flattened state needs to be greater than a compression rate of the elastic component 33 when the rotation mechanism 32 rotates to the folded state. This can ensure that, when the rotation mechanism 32 rotates to the flattened state, a spring force generated by compressing the elastic component 33 can push the support member 321, so that the flexible screen 10 is flattened.

It may be understood that, when the rotation mechanism 32 rotates to the flattened state, the primary shaft mechanism 31 presses against the first end of the elastic component 33, to have pressure on the first end of the elastic component 33 in a direction towards the second end of the elastic component 33, so that the elastic component 33 is in the compressed state. In this way, the elastic component 33 may generate the spring force, and when a user releases or reduces an active force applied to the framing member 20 on one side of the support member 321 in the flattened direction, the second end of the elastic component 33 may drive the support member 321 to move far away from the primary shaft mechanism 31, so that the flexible screen 10 is flattened.

The second end of the elastic component 33 is connected to the support member 321, so that the support member 321 stops the second end of the elastic component 33. For example, the second end of the elastic component 33 may be directly fastened to the support member 321. For example, the second end of the elastic component 33 may be bonded, welded, or clamped to the support member 321. Certainly, in some examples, the second end of the elastic component 33 may alternatively press against the support member 321. For example, the second end of the elastic component 33 may alternatively press against the support member 321 in the manner shown in FIG. 20 (for details, refer to related content in the following).

It should be noted that the first end and the second end of the elastic component 33 are respectively two ends that are disposed opposite to each other along a scaling direction of the elastic component 33. The first end of the elastic component 33 is an end that cooperates with the primary shaft mechanism 31, and the second end of the elastic component 33 is an end that is connected to the support member 321.

It may be understood that the elastic component 33 is movably disposed on the support member 321. For example, the first end of the elastic component 33 is in a free state, that is, is not connected to the support member 321, to ensure that the elastic component 33 can be scaled. The scaling direction of the elastic component 33 may be consistent with the flattened direction (refer to a direction shown by an arrow a in FIG. 11). This can ensure that the elastic component 33 drives, under an action of the spring force, the support member 321 to move along the direction of the arrow a, so that the flexible screen 10 on the inner surface of the support member 321 also moves along the direction of the arrow a, and is finally flattened.

In actual application, the primary shaft mechanism 31 includes a primary inner shaft and a primary outer shaft, the primary outer shaft covers an outer surface of the primary inner shaft, and the first end of the elastic component 33 may cooperate with a side wall of the primary inner shaft, so that the primary inner shaft extrudes the elastic component 33 when the rotation mechanism 32 rotates to the flattened state, and the second end of the elastic component 33 drives the support member 321 to move far away from the primary shaft mechanism 31 along the direction of the arrow a.

As shown in FIG. 11, an example in which the elastic component 33 is a compression spring is used, and a second end of the compression spring presses against the support member 321, so that the second end of the compression spring is fastened to the support member 321. In addition, when the rotation mechanism 32, for example, the support member 321, rotates to the flattened state, the first end of the compression spring presses against the side wall of the primary shaft mechanism 31, that is, the first end of the compression spring interferes with the primary shaft mechanism 31, so that the primary shaft mechanism 31 has pressure on the compression spring in a direction towards the support member 321. When the compression spring is under the pressure of the primary shaft mechanism 31, the compression spring is compressed, and generates a spring force. The spring force is applied to the support member 321, and a direction of the spring force is consistent with the flattened direction. When a force applied to the second end of the support member 321 in the flattened direction is less than the spring force, the compression spring drives the support member 321 to move far away from the primary shaft mechanism 31 in the flattened direction.

The user unfolds the foldable-screen device from a folded state to a flattened state. For example, the user rotates the support member 321 to the flattened state by using the framing member 20, and the user releases or reduces the active force applied to the framing member 20 in the flattened direction. In this case, the elastic component 33 in the compressed state drives the support member 321 to move far away from the primary shaft mechanism 31 along the direction of the arrow a in FIG. 7, and thus the rotation mechanism 32 moves away from the primary shaft mechanism 31 along the direction of the arrow a in FIG. 7.

Based on an arching degree of the flexible screen 10 when the rotation mechanism 32 rotates to the flattened state, an interference degree between the first end of the elastic component 33 and the primary shaft mechanism 31 in the flattened state may be adjusted, to adjust a compression rate of the elastic component 33. For example, when the arching degree of the flexible screen 10 is high when the rotation mechanism 32 rotates to the flattened state, the user may further press the support member 321 in a direction towards the primary shaft mechanism 31 when rotating the support member 321 to the flattened state by using the framing member 20, to increase the compression rate of the elastic component 33, so that the spring force of the elastic component 33 is increased and a driving force of the elastic component 33 on the support member 321 is increased, movement displacement of the support member 321 along the direction of the arrow a in FIG. 7 is increased, and that the flexible screen 10 is flattened is ensured.

Certainly, in some examples, to adjust the interference degree between the first end of the elastic component 33 and the primary shaft mechanism 31 in the flattened state, elastic components 33 of different lengths may be selected, or elastic components 33 of different spring forces may be selected. For example, when the arching degree of the flexible screen 10 is high when the rotation mechanism 32 rotates to the flattened state, an elastic component 33 of a long length may be selected, so that the primary shaft mechanism 31 has a large compression rate in a direction from the first end to the second end of the elastic component 33 when the rotation mechanism 32 rotates to the flattened state, and the spring force of the elastic component 33 is increased. Alternatively, an elastic component 33 having good elasticity may be selected, so that that the elastic component 33 has a large spring force in a specific compressed state can be ensured when the primary shaft mechanism 31 presses against the elastic component 33.

The support member 321 shown in FIG. 7 and FIG. 11 is located on a right side of the primary shaft mechanism 31. Therefore, the support member 321 may move far away from the primary shaft mechanism 31 along the direction of the arrow a in FIG. 7. The support member 321 on a left side of the primary shaft mechanism 31 is not shown in FIG. 7 and FIG. 11. The support member 321 on the left side of the primary shaft mechanism 31 moves far away from the primary shaft mechanism 31 along a direction opposite to the arrow a in FIG. 7.

As shown in FIG. 7, a part of the flexible screen 10 is connected, for example, is bonded to the first surface 3211 of the support member 321. In this way, when the elastic component 33 drives the support member 32 to move far away from the primary shaft mechanism 31 along the direction of the arrow a in FIG. 7, the flexible screen 10 on the support member 32 may be directly driven to be flattened in a direction far away from the primary shaft mechanism 31. This ensures flatness of the flexible screen 10 of the foldable-screen device in the flattened state, reduces, in a process of transferring the spring force generated by the elastic component 33 to the flexible screen 10, a loss of the spring force, and improves reliability of driving the flexible screen 10 by the elastic component 33.

Because the second end of the support member 321 of the rotation mechanism 32 is connected to the corresponding framing member 20, the framing member 20 (for example, the first framing member 21 and the second framing member 22) moves far away from the primary shaft mechanism 31 under driving of the support member 321. In this way, the flexible screen 10 may be flattened in the direction far away from the primary shaft mechanism 31 under driving of the framing member 20. This avoids a case in which the flexible screen 10 is arched at a joint between the rotation mechanism 32 and the primary shaft mechanism 31 when the hinge component 30 is in the flattened state, and ensures the flatness of the flexible screen 10 of the foldable-screen device in the flattened state.

As shown in FIG. 11, when the hinge component 30 is in the flattened state, the support member 321 on one side of the primary shaft mechanism 31 moves rightwards (the direction of the arrow a in FIG. 7) under driving of the elastic component 33, to drive the first framing member 21 to move rightwards, so that a first display region 11 on a surface of the first framing member 21 moves rightwards, and thus pull the third display region 13 on the hinge component 30. In this way, the flexible screen 10 in a bending region on the right side of the primary shaft mechanism 31 is flatten.

The support member 321 on the other side of the primary shaft mechanism 31 moves leftwards (the direction opposite to the arrow a in FIG. 7) under driving of the elastic component 33, to drive the second framing member 22 to move leftwards, so that a second display region 12 on a surface of the second framing member 22 moves leftwards, and thus pull the third display region 13 on the hinge component 30. In this way, the flexible screen 10 in a bending region on a left side of the hinge component 30 is flattened.

In addition, because a part of the flexible screen 10, for example, the third display region 13, is disposed on a surface of one side of the hinge component 30, when the elastic component 33 drives the support member 321 to move far away from the primary shaft mechanism 31, the support member 321 may directly drive the third display region 13 on the support member 321 to move far away from the primary shaft mechanism 31, so that the flexible screen 10 is flattened. This improves display performance of the foldable-screen device, and also improves a lifespan of the flexible screen 10.

For example, when the two support members 321 on the two sides of the primary shaft mechanism 31 rotate to the flattened state, the support member 321 on the right side of the primary shaft mechanism 31 moves rightwards (as shown by the direction of the arrow a in FIG. 7) under driving of the elastic component 33, that is, the rotation mechanism 32 on the right side moves rightwards, and the flexible screen 10 on an inner surface of the rotation mechanism 32 moves rightwards under pulling of the rotation mechanism 32, so that the flexible screen 10 between the rotation mechanism 32 on the right side and the primary shaft mechanism 31 is flattened.

Correspondingly, the support member 321 on the left side of the primary shaft mechanism 31 moves leftwards (the direction opposite to the arrow a shown in FIG. 7) under driving of the elastic component 33, that is, the rotation mechanism 32 on the left side moves leftwards, and the flexible screen 10 on the inner surface of the rotation mechanism 32 moves leftwards under the pulling of the rotation mechanism 32, so that the flexible screen 10 between the rotation mechanism 32 on the left side and the primary shaft mechanism 31 is flattened.

It may be understood that the second end of the elastic component 33 may press against any position of the support member 321. For example, an installation slot (not shown) may be disposed on the support member 321, at least a part of the elastic component 33 is accommodated in the installation slot, and the second end of the elastic component 33 presses against an inner wall of the installation slot.

Figure 12:
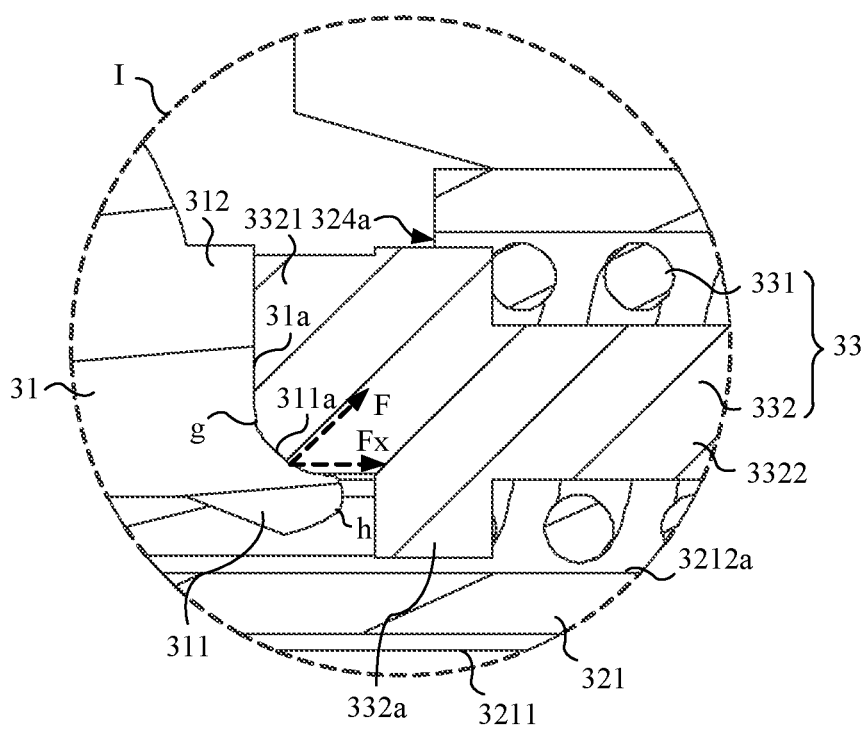
FIG. 12 is a partially enlarged view of a position I in FIG. 11.
Figure 13:
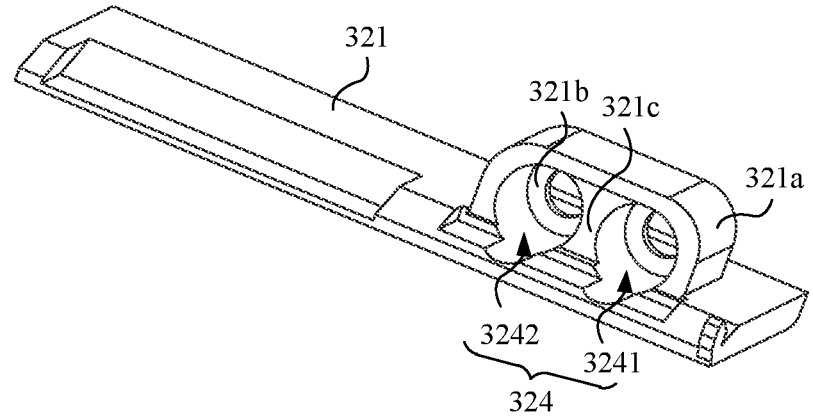
FIG. 13 is a schematic diagram of a structure of a primary shaft mechanism in FIG. 7 of a first angle of view.
Figure 14:
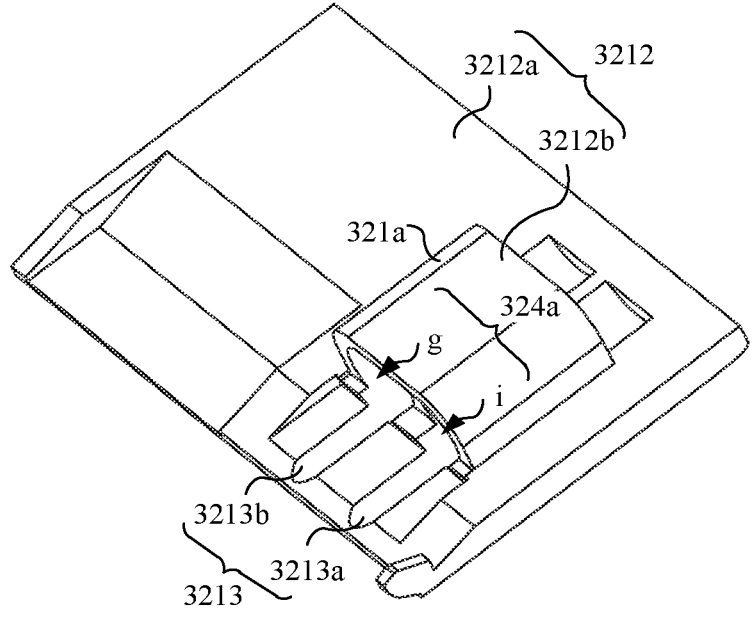
FIG. 14 is a schematic diagram of a structure of a primary shaft mechanism in FIG. 7 of a second angle of view.

FIG. 12 is a partially enlarged view of the position I in FIG. 11, FIG. 13 is a schematic diagram of a structure of the primary shaft mechanism in FIG. 7 of a first angle of view, and FIG. 14 is a schematic diagram of a structure of the primary shaft mechanism in FIG. 7 of a second angle of view. As shown in FIG. 13, in some examples, the support member 321 may have an installation channel 324, and a side that is of the installation channel 324 and that faces the primary shaft mechanism 31 has a first opening 324a (as shown in FIG. 14). In other words, the installation channel 324 penetrates a surface of one side that is of the support member 321 and that faces the primary shaft mechanism 31. In this way, a first end of an elastic component 33 may extend out of the installation channel 324 (as shown in FIG. 12), and interfere with a side wall of the primary shaft mechanism 31. Alternatively, a part of the primary shaft mechanism 31 may extend into the installation channel 324 through the first opening 324a, and interfere with a second end of the elastic component 33.

The installation channel 324 may be a through hole directly disposed in the support member 321 during specific disposing. It may be understood that the through hole is disposed between the inner surface and the outer surface of the support member 321. As shown in FIG. 13, in some examples, the outer surface of the support member 321 may further have an installation part 321a, and the installation channel 324 is disposed in the installation part 321a, to ensure structural stability of the installation channel 324.

It may be understood that, when the outer surface of the support member 321 has the installation part 321a, the outer surface of the support member 321 includes a first main surface 3212a and an installation surface 3212b (as shown in FIG. 14). The installation surface 3212b is a top surface that is on the installation part 321a and that faces a same direction as the first main surface 3212a, and the installation surface 3212b is higher than the first main surface 3212a.

As shown in FIG. 11, at least a part of the elastic component 33 is accommodated in the installation channel 324, the second end of the elastic component 33 presses against an inner wall of the installation channel 324, and the first end of the elastic component 33 presses against the primary shaft mechanism 31 by using the first opening 324a (as shown in FIG. 12). The elastic component 33 may freely move in the installation channel 324, to ensure that the elastic component 33 performs normal compression and extension.

As shown in FIG. 11 and FIG. 12, the compression spring is still used as an example. The second end of the compression spring may press against the inner wall of the installation channel 324, and the first end of the compression spring may extend from the first opening 324a to an outside of the installation channel 324. When the support member 321 rotates to the flattened state, the side wall of the primary shaft mechanism 31 presses against the first end of the compression spring, to extrude the compression spring. When a force applied to the second end of the support member 321 along the flattened direction is less than a current spring force of the compression spring, the compression spring stretches in the flattened direction, and drives, by using the second end of the compression spring, the support member 321 to move far away from the primary shaft mechanism 31 in the flattened direction.

In this embodiment of this application, the installation channel 324 is disposed on the support member 321, and the at least a part of the elastic component 33 is accommodated in the installation channel 324, so that the compression and stretching of the elastic component 33 are both completed in the installation channel 324.

Disposing of the installation channel 324 limits a movement range of the elastic component 33 in a direction parallel to the axial line (as shown by 1 in FIG. 7) of the primary shaft mechanism 31, and increases an assembly area between the elastic component 33 and the support member 321, so that structural stability of the elastic component 33 on the support member 321 is improved, and driving of the elastic component 33 on the support member 321 is more reliable.

Figure 15:
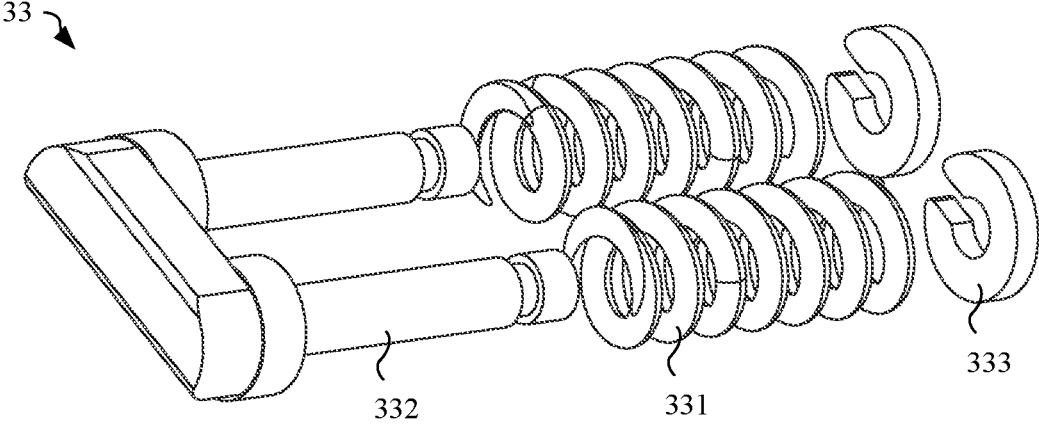
FIG. 15 is an exploded view of an elastic component in FIG. 7.

FIG. 15 is an exploded view of the elastic component in FIG. 7. As shown in FIG. 15, to improve structural stability of the elastic component 33, the elastic component 33 in this embodiment of this application may include an elastic member 331 and a push block 332 (as shown in FIG. 11 and FIG. 15). A first end of the push block 332 extends out to the outside of the installation channel 324, and cooperates with the primary shaft mechanism 31. For example, a part of the push block 332 may extend out to the first opening 324a of the installation channel 324, and cooperates with the side wall of the primary shaft mechanism 31 (as shown in FIG. 12). A second end of the push block 332 presses against a first end of the elastic member 331, and a second end of the elastic member 331 presses against an inner wall of the installation channel 324. In other words, the push block 332 presses against the inner wall of the installation channel by using the elastic member 331. The elastic member 331 may be a compression spring.

When the rotation mechanism 32 rotates to the flattened state, the side wall of the primary shaft mechanism 31 extrudes the push block 332 (as shown in FIG. 11), so that the elastic member 331 is in a compressed state. Further, when the force applied to the second end of the support member 321 is less than a spring force of the elastic member 331, the elastic member 331 may push the support member 321 to move far away from the primary shaft mechanism 31, so that the flexible screen 10 is flattened. In addition, the push block 332 contacts the side wall of the primary shaft mechanism 31. This increases a contact area between the elastic component 33 and the primary shaft mechanism 31, so that the primary shaft mechanism 31 stably pushes the elastic component 33 to move along the flattened direction, and that the support member 321 moves stably along the flattened direction under driving of the elastic component 33 is further ensured.

During disposing, the first end of the elastic member 331 may alternatively be connected to the push block 332, to improve assembly stability between the elastic member 331 and the push block 332.

Figure 16:
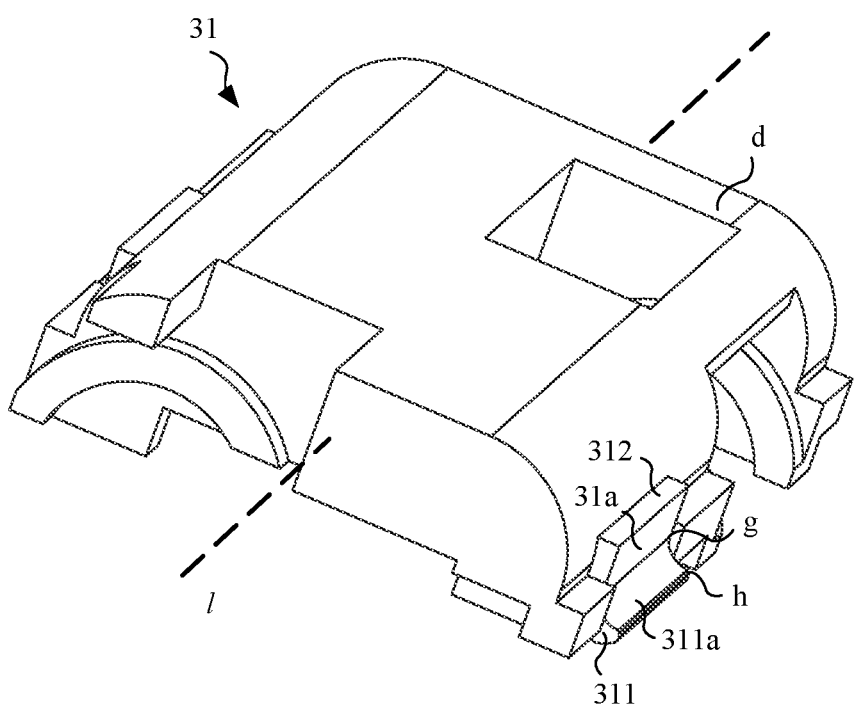
FIG. 16 is a schematic diagram of a structure of a primary shaft mechanism in FIG. 7.

FIG. 16 is a schematic diagram of a structure of the primary shaft mechanism in FIG. 7. As shown in FIG. 16, to improve pressing stability between the primary shaft mechanism 31 and the push block 332, in some examples, the primary shaft mechanism 31 may have a holding part 311, and the holding part 311 is located on the side wall that is of the primary shaft mechanism 31 and that faces the push block 332 (as shown in FIG. 12). It may be understood that the holding part 311 has a holding surface 311a, and the holding surface 311a faces the outer surface of the primary shaft mechanism 31 (as shown by d in FIG. 16).

When the support member 321 rotates to the flattened state, at least a part of a surface of a first end of the push block 332 is supported on the holding part 311 (as shown in FIG. 12). For example, the at least a part of the surface of the first end of the push block 332 is supported on the holding surface 311a of the holding part 311. This can ensure that the push block 332 can stably press against the side wall of the primary shaft mechanism 31 when being extruded by the primary shaft mechanism 31, and the push block 332 does not slide downward along the side wall of the primary shaft mechanism 31 (in a direction towards the flexible screen 10). Therefore, that the support member 321 moves along the flattened direction of the hinge component 30 under driving of the push block 332 and the elastic member 331 is ensured.

As shown in FIG. 16, the holding part 311 includes a free end h and a constraint end g that are disposed opposite to each other along an axial direction perpendicular to the primary shaft mechanism 31, where the constraint end g is close to the axial line l of the primary shaft mechanism 31, and the free end h is far away from the axial line l of the primary shaft mechanism 31. In other words, the constraint end g of the holding part 311 is an end that is of the holding part 311 and that is connected to the primary shaft mechanism 31. The free end h of the holding part 311 is an end facing the push block 332 (as shown in FIG. 12).

During specific disposing, a distance between the free end h and the outer surface d of the primary shaft mechanism 31 is greater than a distance between the constraint end g and the outer surface d of the primary shaft mechanism 31. In other words, the outer surface d of the primary shaft mechanism 31 is used as a reference surface, and the free end h of the holding part 311 is lower than the constraint end g, so that the holding part 311 is disposed inclinedly towards the push block 332 (as shown in FIG. 12). The free end h is disposed protuberantly in a first direction relative to the constraint end g, and the first direction is an extension direction of the primary shaft mechanism 31 towards the elastic component 33 when the foldable-screen device is in a flattened state. In this way, when the first end of the push block 332 is supported on the holding part 311, the holding part 311 has a component force (as shown by Fx in FIG. 12) on the push block 332 in the flattened direction, so that an active force of the primary shaft mechanism 31 on the push block 332 in the flattened direction is increased, and that a spring force generated by compressing the elastic member 331 can stably drive the support member 321 to move far away from the primary shaft mechanism 31 is ensured. In FIG. 12, F is a joint force of the holding part 311 on the push block 332, and Fx is the component force of the holding part 311 on the push block 332 in the flattened direction.

As shown in FIG. 16, a side surface that is of the primary shaft mechanism 31 and that faces the push block 332 includes a second main surface 31a and a holding surface 311a, and the second main surface 31a is located on a side that is of the holding surface 311a and that is close to the outer surface d of the primary shaft mechanism 31.

Figure 17:
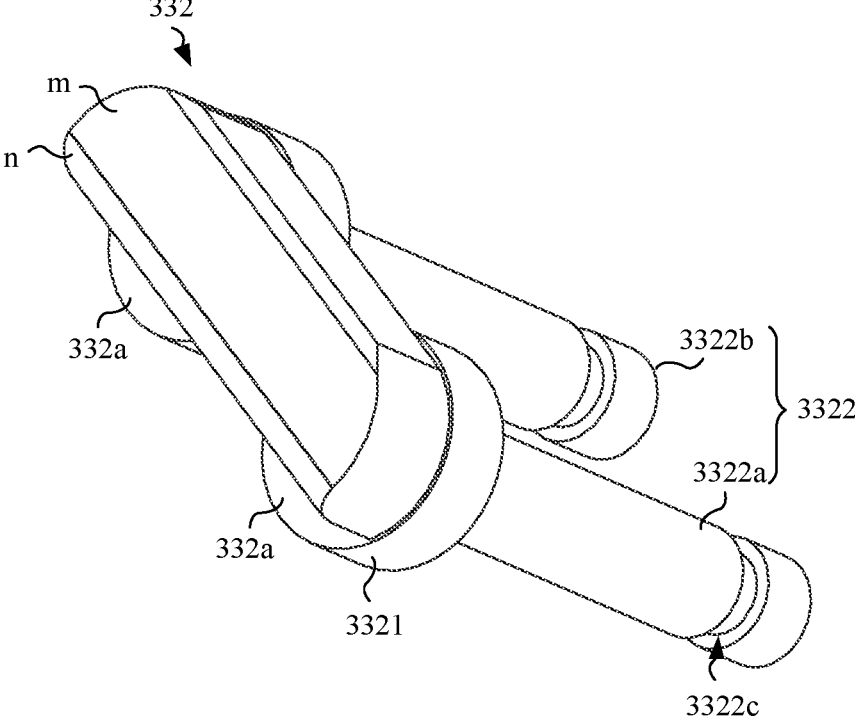
FIG. 17 is a schematic diagram of a structure of a push block in FIG. 15.

FIG. 17 is a schematic diagram of a structure of the push block in FIG. 15. As shown in FIG. 17, an end face of the first end of the push block 332 includes a third main surface m and a bending surface n, and the bending surface n is located on a side that is of the third main surface m and that is close to the flexible screen 10. When the support member 321 rotates to the flattened state, the third main surface m of the push block 332 presses against a second main surface 31*a* of the primary shaft mechanism 31 in a manner of facing each other, and the bending surface n of the push block 332 presses against a holding surface 311*a* of the primary shaft mechanism 31.

Figure 18:
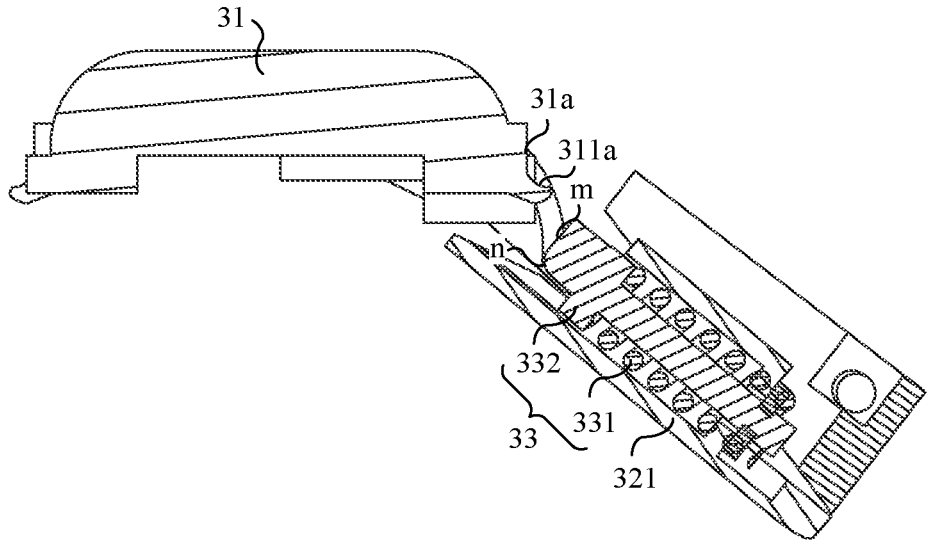
FIG. 18 is a sectional view of a part of a structure in FIG. 8.

FIG. 18 is a sectional view of a part of the structure in FIG. 8. As shown in FIG. 11 and FIG. 18, before the support member 321 rotates to the flattened state, as a first end of the support member 321 rotates, a third main surface m of a first end of a push block 332 rotates towards a second main surface 31*a* of the primary shaft mechanism 31, a bending surface n of the first end of the push block 332 rotates towards a holding surface 311*a* of the primary shaft mechanism 31 until the support member 321 rotates to the flattened state, the third main surface m presses against the second main surface 31*a*, and the bending surface n presses against the holding surface 311*a* (as shown in FIG. 12), so that the primary shaft mechanism 31 extrudes the push block 332 in a direction (as shown by the direction of the arrow a in FIG. 11) facing away from the primary shaft mechanism 31 by using the second main surface 31*a* and the holding surface 311*a*, thus an elastic member 331 at one end of the push block 332 is compressed, and the elastic member 331 generates a spring force and moves far away from the primary shaft mechanism 31 by pushing the support member 321.

Figure 19:
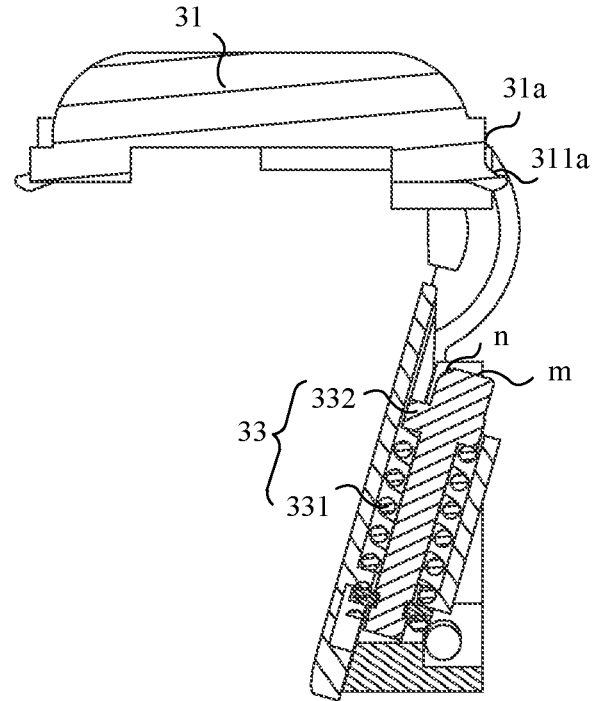
FIG. 19 is a sectional view of a part of a structure in FIG. 9.

FIG. 19 is a sectional view of a part of the structure in FIG. 9. As shown in FIG. 11 and FIG. 19, correspondingly, when the support member 321 starts to rotate from the flattened state to the folded state, a first end of a push block 332 moves upward (that is, far away from the flexible screen 10), and a bending surface n of the first end of the push block 332 may be first detached from the holding surface 331*a* of the primary shaft mechanism 31 (as shown in FIG. 12), and then a third main surface m of the first end of the push block 332 is detached from a second main surface 31*a* of the primary shaft mechanism 31. Until the support member 321 rotates to the folded state, the first end of the push block 332 is completely detached from the side wall of the primary shaft mechanism 31 (as shown in FIG. 9).

It may be understood that, as shown in FIG. 12, both the second main surface 31*a* and the third main surface m may be planes perpendicular to the flattened direction, so that the push block 332 can be subject to an extrusion force of the primary shaft mechanism 31 in the flattened direction when the push block 332 is rotated to a flattened state. This ensures that an elastic member 331 is stably compressed in the flattened direction.

To ensure that the first end of the push block 332 can better avoid the side wall of the primary shaft mechanism 31 when the support member 321 rotates around the primary shaft mechanism 31, at least a part of a surface that is of a holding part 311 and that faces the push block 332 may be an arc surface, and at least a part of a surface of the first end of the push block 332 is an arc surface that cooperates with the arc surface. For example, at least a part of the holding surface 311*a* of the holding part 311 is set as the arc surface, at least a part of the bending surface n of the push block 332 is set as the arc surface that cooperates with the arc surface, so that the first end of the push block 332 can well avoid the holding part 311 in a rotation process, without affecting stability of the push block 332 in an installation channel 324.

In addition, the at least a part of the surface that is of the holding part 311 and that faces the push block 332 is the arc surface. In comparison with a plane structure, a contact area between the bending surface n of the first end of the push block 332 and the holding surface 311*a* is increased, so that stability of the bending surface n of the push block 332 on the holding surface 311*a* is increased (as shown in FIG. 12).

Still as shown in FIG. 16, in this embodiment of this application, a side wall that is of the primary shaft mechanism 31 and that faces the push block 332 may have a reinforcement part 312. A constraint end g of the holding part 311 is connected to the reinforcement part 312, and a part of the surface of the first end of the push block 332 cooperates with the reinforcement part 312.

It may be understood that, the second main surface 31*a* of the primary shaft mechanism 31 is formed on a surface that is of the reinforcement part 312 and that faces the push block 332. When the support member 321 rotates to the flattened state, the third main surface m of the first end of the push block 332 presses against the surface of the reinforcement part 312 (as shown in FIG. 12).

In this embodiment of this application, the reinforcement part 312 is disposed on the side wall that is of the primary shaft mechanism 31 and that faces the push block 332, to improve mechanical strength of the side wall of the primary shaft mechanism 31, ensure that the side wall of the primary shaft mechanism 31 is not damaged in a long-term pressing process against the first end of the push block 332, and prolong a lifespan of the primary shaft mechanism.

It can be learned from the foregoing that, when the support member 321 rotates to the flattened state, a part of the surface, for example, the bending surface n, of the first end of the push block 332 is supported on the holding surface 311*a* of the primary shaft mechanism 31, so that there is a specific spacing between the bending surface n of the push block 332 and an installation surface (for example, an inner bottom wall of the installation channel 324) that is of the support member 321 and that is used to dispose the push block 332. It may be understood that the inner bottom wall of the installation channel 324 may be considered as the first main surface 3212*a* of the support member 321 (as shown in FIG. 12 and FIG. 14).

As shown in FIG. 12, based on this, to ensure that the push block 332 can move along the flattened direction, the push block 332 may have a support part 332*a*. The support part 332*a* is located on a side that is of the push block 332 and that faces the flexible screen 10. The support part 332*a* is supported on a surface of the support member 321. For example, the support part 332*a* is supported on the first main surface 3212*a* of the support member 321.

In this embodiment of this application, the support part 332*a* is disposed on the side that is of the push block 332 and that faces the flexible screen 10, and the support part 332*a* is supported on the support member 321, so that the first end of the push block 332 can move along the surface of the support member 321 when being extruded by the primary shaft mechanism 31. In particular, when a part of the first end of the push block 332 is supported on the holding part 311 of the primary shaft mechanism 31, the push block 332 moves stably along the surface of the support member 321 by using the support part 332*a*, to ensure that the push block 332 moves stably in the flattened direction without an up-down shift, so that the elastic member 331 is compressed to a greater extent, and drives the support member 321 to move far away from the primary shaft mechanism 31.

As shown in FIG. 14, during disposing, the support member 321 may have a sliding slot 3213, at least a part of the sliding slot 3213 is disposed between a first opening 324*a* and the primary shaft mechanism 31, and the support part 332*a* is slidably disposed in the sliding slot 3213. For example, the sliding slot 3213 may be disposed on the surface of the support member 321 between the first opening 324*a* and the primary shaft mechanism 31, so that the support part 332*a* of the push block 332 is supported in the sliding slot 3213.

The support part 332*a* is slidably disposed in the sliding slot 3213, so that slot walls on the two opposite sides of the sliding slot 3213 limit movement of the support part 332*a* that is perpendicular to the flattened direction, that is, limit a moving path of the support part 332*a* on the support member 321. This ensures that the support part 332*a* moves stably in the flattened direction, and thus ensures that the push block 332 can compress the elastic member 331 in the flattened direction, and ensures that a spring force generated by compressing the elastic member 331 can stably drive the support member 321 to move.

As shown in FIG. 17, during disposing, the push block 332 in this embodiment of this application may include a main part 3321 and at least one connection part 3322. One end of the main part 3321 is connected to the connection part 3322, and another end of the main part 3321 cooperates with the primary shaft mechanism 31 (as shown in FIG. 12), to ensure that the another end of the main part 3321 is extruded by the primary shaft mechanism 31. In other words, the main part 3321 is disposed close to the primary shaft mechanism 31, the connection part 3322 is disposed far away from the primary shaft mechanism 31, and at least a part of the elastic member 331 is sleeved on the connection part 3322, to improve stability of the elastic member 331 on the push block 332, so that the elastic member 331 can be stably compressed or stretched along the connection part 3322.

The support part 332*a* of the push block 332 is disposed on a side that is of the main part 3321 and that faces the flexible screen 10, so that the main part 3321 stably moves along the sliding slot 3213 of the support member 321. In addition, an extension direction of the connection part 3322 of the push block 332 is consistent with a scaling direction of the elastic member 331, so that the elastic member 331 moves freely along the extension direction of the connection part 3322.

Figure 20:
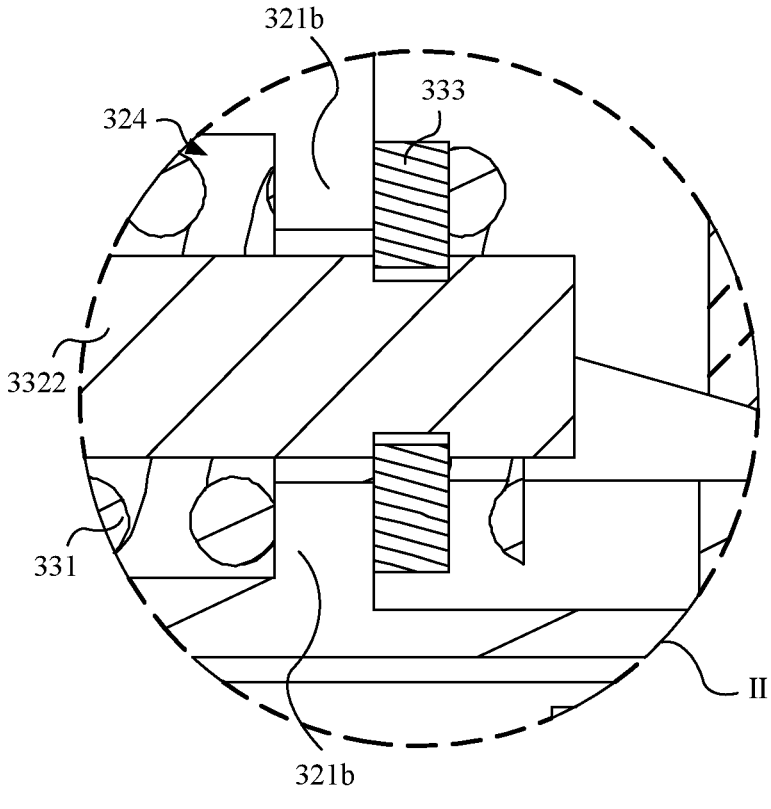
FIG. 20 is a partially enlarged view of a position II in FIG. 11.

FIG. 20 is a partially enlarged view of the position II in FIG. 11. As shown in FIG. 13 and FIG. 20, to ensure that the elastic component 33 stably moves in the installation channel 324, the inner wall of the installation channel 324 may have a pressing part 321*b*. A second end of the elastic member 331 presses against a side that is of the pressing part 321*b* and that faces the first opening 324*a*, to ensure that the elastic component 33 is stably connected to the support member 321.

It may be understood that one end of the pressing part 321*b* is connected to the inner wall of the installation channel 324, and another end of the pressing part 321*b* is located in an inner cavity of the installation channel 324 (as shown in FIG. 13). In this way, the pressing part 321*b* includes two surfaces disposed opposite to each other, where one surface faces the first opening 324*a* of the installation channel 324, and the other surface faces away from the first opening 324*a* of the installation channel 324. The second end of the elastic member 331 presses against the surface that is of the pressing part 321*b* and that faces the first opening 324*a* (as shown in FIG. 20), so that when the elastic member 331 is in the compressed state, the second end of the elastic member 331 may drive the support member 321 to move along a spring force direction.

It should be noted that, when the elastic member 331 is the compression spring, a surface that faces away from the first end of the compression spring is located at any position along a compression direction of the compression spring. Therefore, the second end of the elastic member 331 may be an end surface that faces away from of the first end of the elastic member 331, or may be a surface that is of any part close to the second end of the elastic member 331 and that faces away from the first end of the elastic member 331. For example, any surface of the elastic member 331 that is close to the second end and that faces away from the first end presses against the pressing part 321*b* (as shown in FIG. 20).

In this embodiment of this application, the second end of the elastic member 331 presses against the pressing part 321*b* in the installation channel 324. This improves pressing stability of the second end of the elastic member 331 against the support member 321, simplifies an assembly process between the elastic member 331 and the installation channel 324, and improves assembly efficiency between the elastic member 331 and the installation channel 324.

As shown in FIG. 11, it may be understood that the push block 332 of the elastic component 33 needs to be movably disposed in the installation channel 324, that is, there is a space in the installation channel 324 in which the push block 332 can move. This ensures that the primary shaft mechanism 31 extrudes the push block 332 to drive the push block 332 to move far away from the primary shaft mechanism 31, and thus implements compression on the elastic member 331.

For example, during disposing, when the push block 332 is in a free state (that is, does not interfere with the primary shaft mechanism 31), there may be a specific distance between one end that is of the connection part 3322 and that faces away from the main part 3321 and the pressing part 321*b*. This ensures that the push block 332 can move along the direction of the arrow a (as shown in FIG. 7) under pressing of the primary shaft mechanism 31.

Figure 21:
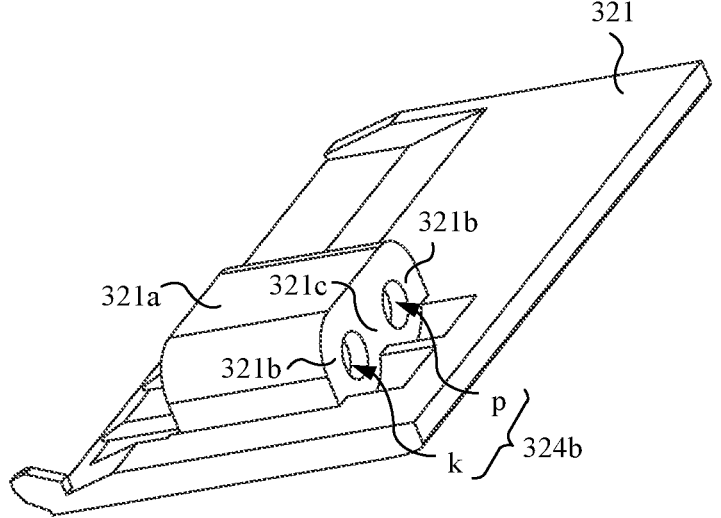
FIG. 21 is a schematic diagram of a structure of a primary shaft mechanism in FIG. 7 of a third angle of view.

FIG. 21 is a schematic diagram of a structure of the primary shaft mechanism in FIG. 7 of a third angle of view. As shown in FIG. 11 and FIG. 21, in some examples, one end that is of an installation channel 324 and that faces away from the primary shaft mechanism 31 may have a second opening 324*b*, and a connection part 3322 movably penetrates the second opening 324*b*. This ensures that the push block 332 can move along the direction of the arrow a (as shown in FIG. 11) under pressing of the primary shaft mechanism 31. It may be understood that one end that is of the connection part 3322 and that faces away from a main part 3321 penetrates out of the second opening 324*b*, and is movably disposed on a side of an outside of the second opening 324*b*.

For example, when the support member 321 rotates to the flattened state, the side wall of the primary shaft mechanism 31 extrudes the main part 3321 of the push block 332, so that the main part 3321 moves along the direction of the arrow a, and drives the connection part 3322 at one end of the main part 3321 to move along the direction of the arrow a, and thus the end that is of the connection part 3322 and that faces away from the main part 3321 moves far away from the second opening 324*b* at the outside of the second opening 324*b*. The elastic member 331 located in the installation channel 324 is in the compressed state under extrusion of the main part 3321.

In the foregoing example, the connection part 3322 movably penetrates the second opening 324*b*, so that a given length of the connection part 3322 is extended. In this way, the elastic member 331 can be sleeved on the connection part 3322 to a greater extent. For example, the elastic member 331 located in the installation channel 324 may be completely sleeved on the connection part 3322, so that that the elastic member 331 is stably compressed or stretched in a moving direction of the push block 332 is ensured.

As shown in FIG. 21, in this embodiment of this application, a pressing part 321*b* may be disposed along a circumferential direction of the installation channel 324. For example, the pressing part 321*b* may be an annular member disposed along the circumferential direction of the installation channel 324, one end of the annular member is connected to an inner wall of the installation channel 324, and another end of the annular member (one end that faces away from the inner wall of the installation channel 324) may enclose the second opening 324*b*. This simplifies a manufacturing process of the second opening 324*b*, and thus improves manufacturing efficiency of the support member 321.

Certainly, in some examples, the pressing part 321*b* may be strip members disposed along the circumferential direction of the installation channel 324 at an interval, and a second end of the elastic member 331 presses against a surface of one side that is of each strip member and that faces the first opening 324*a*. One end of each strip member is connected to the inner wall of the installation channel 324, and another end (an end that faces away from the inner wall of the installation channel 324) of each strip member may enclose the second opening 324*b*.

To improve stability of the elastic member 331 on the connection part 3322, as shown in FIG. 15, the elastic component 33 may further include the positioning member 333, where the positioning member 333 is sleeved on the end that is of the connection part 3322 and that faces away from the main part 3321 (as shown in FIG. 20), and at least a part of the elastic member 331 is sleeved between the main part 3321 and the positioning member 333.

As shown in FIG. 17, during disposing, the installation slot 3322*c* may be formed on the connection part 3322 along a circumferential direction, and the positioning member 333 is clamped in the installation slot 3322*c*.

The positioning member 333 is located on one side (as shown in FIG. 12 and FIG. 20) that is of the pressing part 321*b* and that faces away the first opening 324*a*, that is, the positioning member 333 is located on the side of the outside of the second opening 324*b*, so that the end that is of the connection part 3322 and that faces away from the main part 3321 is limited outside the second opening 324*b*. This can ensure that the connection part 3322 does not enter the installation channel 324 from the second opening 324*b* in any state, and is not detached from the installation channel 324 from the first opening 324*a*, that is, the push block 332 is not detached from the installation channel 324 from the first opening 324*a* in any state. This ensures stability of the push block 332 in the installation channel 324.

As shown in FIG. 11, when the support member 321 rotates to the flattened state, the side wall of the primary shaft mechanism 31 extrudes the main part 3321 in a direction towards the connection part 3322, so that the elastic member 331 on the connection part 3322 is in the compressed state. The elastic member 331 generates a spring force in the compressed state, and the spring force is applied to the pressing part 321*b*, to drive the support member 321 to move far away from the primary shaft mechanism 31. In this way, the flexible screen 10 on one side of the support member 321 is flattened.

When the elastic member 331 drives the support member 321 to move far away from the primary shaft mechanism 31, the connection part 3322 moves in a direction close to the primary shaft mechanism 31 relative to the support member 321. Because the positioning member 333 presses against a surface of an outer end of the second opening 324*b*, the end that is of the connection part 3322 and that faces away from the main part 3321 does not enter the installation channel 324 from the second opening 324*b*, and is not detached from the first opening 324*a* of the installation channel 324, so that the push block 332 and the elastic member 331 on the push block 332 are stably assembled in the installation channel 324.

As shown in FIG. 17, there may be one or more connection parts 3322. When there is one connection part 3322 (not shown), the connection part 3322 may be disposed at a central position of the main part 3321. This ensures that an active force of the elastic member 331 on the connection part 3322 of the main part 3321 is applied to the center of the main part 3321, and thus ensures that the elastic member 331 is compressed along a moving direction of the main part 3321, and avoids driving to the support member 321 in the flattened direction caused when the elastic member 331 inclines perpendicular to a compression direction.

As shown in FIG. 17, there may alternatively be at least two connection parts 3322, and the at least two connection parts 3322 are disposed on one end of the main part 3321 at an interval.

There may be one or more elastic members 331, and each elastic member 331 is sleeved on a corresponding connection part 3322 (as shown in FIG. 10 and FIG. 15). In other words, the connection part 3322 and the elastic member 331 may be disposed in a one-to-one correspondence, so that the elastic member 331 is stably compressed along the moving direction of the main part 3321, to push the support member 321 to move stably along a spring force direction under action of the two elastic members 331, and further push the support member 321 to move stably in the flattened direction.

Figure 22:
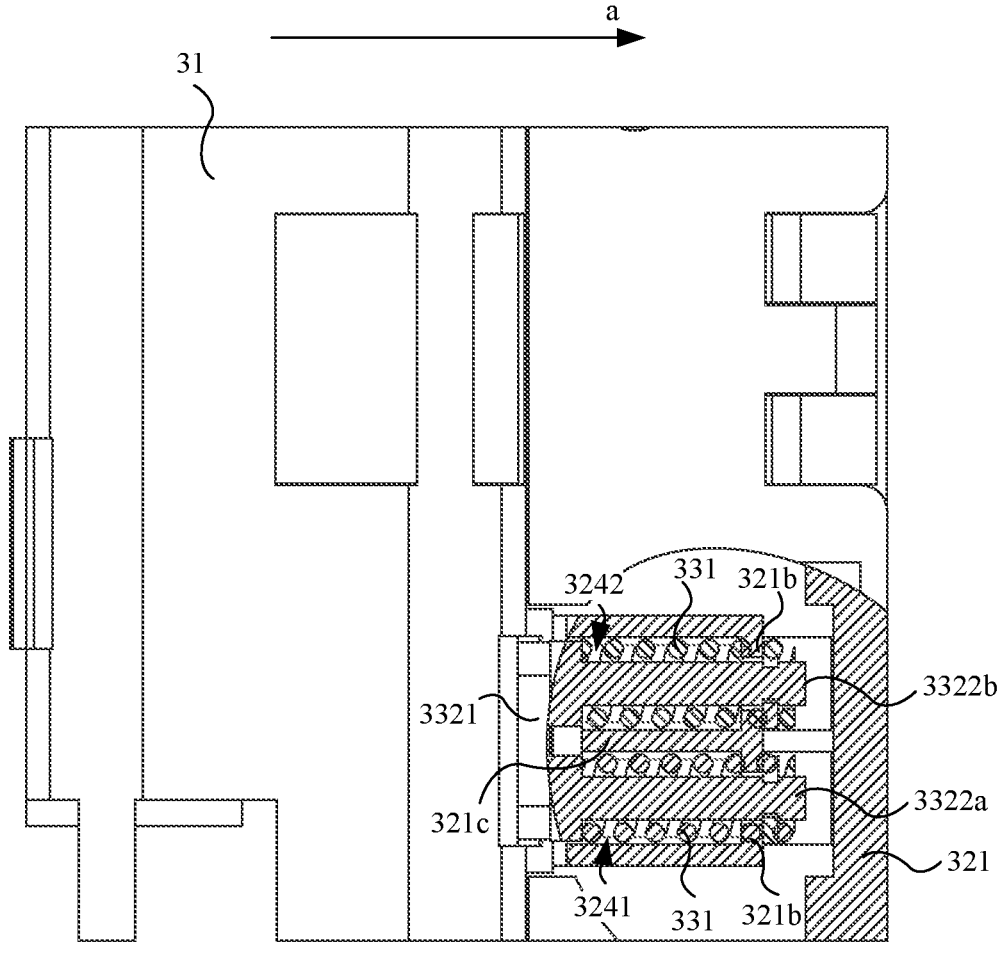
FIG. 22 is a partial sectional view of FIG. 7.

FIG. 22 is a partial sectional view of FIG. 7. As shown in FIG. 13 and FIG. 22, when there are a plurality of connection parts 3322, an installation channel 324 may have an isolation part 321*c* in. The isolation part 321*c* divides the installation channel 324 into a plurality of sub-channels, and the plurality of sub-channels are disposed side by side along a direction parallel to the axial line of the primary shaft mechanism 31.

An example in which there are two connection parts 3322 is used, and the installation channel 324 has one isolation part 321*c*. As shown in FIG. 13, the isolation part 324*c* divides the installation channel 324 into two sub-channels, the two sub-channels are disposed side by side along the direction parallel to the axial line of the primary shaft mechanism 31, and at least a part of each of the two connection parts 3322 is disposed in a corresponding sub-channel.

As shown in FIG. 13, the two sub-channels separately include a first sub-channel 3241 and a second sub-channel 3242. As shown in FIG. 17, the two connection parts 3322 separately include a first connection part 3322*a* and a second connection part 3322*b*. The first connection part 3322*a* and an elastic member 331 on the first connection part 3322*a* are movably disposed in the first sub-channel 3241. Correspondingly, the second connection part 3322*b* and an elastic member 331 on the second connection part 3322*b* are movably disposed in the second sub-channel 3242 (as shown in FIG. 22).

As shown in FIG. 14 and FIG. 21, it may be understood that, two ends of the isolation part 321*c* may respectively extend to a first opening 324*a* and a second opening 324*b* of the installation channel 324, so that the first opening 324*a* is divided into a first sub-opening i and a first sub-opening j, where the first sub-opening i is a first opening 324*a* corresponding to the first sub-channel 3241, and the first sub-opening j is a first opening 324*a* corresponding to the second sub-channel 3242 (as shown in FIG. 14).

As shown in FIG. 21, correspondingly, the isolation part 321*c* divides the second opening 324*b* into a second sub-opening k and a second sub-opening p, where the second sub-opening k is a second opening 324*b* corresponding to the first sub-channel 3241, and the second sub-opening p is a second opening 324*b* corresponding to the second sub-channel 3242. It may be understood that the second sub-opening k and the second sub-opening p may be enclosed by a part of a pressing part 321*b* and the isolation part 321*c*.

As shown in FIG. 22, a main part 3321 of a push block 332 is located on one side that is of the first opening 324*a* and that faces the primary shaft mechanism 31 (that is, one side that is of the installation channel 324 and that faces the primary shaft mechanism 31), and one end that is of the first connection part 3322*a* and that faces away from the main part 3321 penetrates to an outside of the second sub-opening k corresponding to the first sub-channel 3241 (that is, one side that is of the first sub-channel 3241 and that faces away from the primary shaft mechanism 31). A second end of the elastic member 331 on the first connection part 3322*a* presses against surfaces of inner ends of the pressing part 321*b* and the isolation part 321*c* that correspond to the first sub-channel 3241. Correspondingly, one end that is of the second connection part 3322*b* and that faces away from the main part 3321 penetrates to an outside of the second sub-opening p corresponding to the second sub-channel 3242, and a second end of the elastic member 331 on the second connection part 3322*b* presses against surfaces of inner ends of the pressing part 321*b* and the isolation part 321*c* that correspond to the second sub-channel 3242.

As shown in FIG. 22, when the support member 321 rotates to the flattened state, a side wall of the primary shaft mechanism 31 extrudes the main part 3321 in a direction towards the connection part 3322, so that the elastic members 331 on the first connection part 3322*a* and the second connection part 3322*b* are both in a compressed state. The two elastic members 331 generate spring forces in the compressed state, and the spring forces are respectively applied to the pressing parts 321*b* and the isolation parts 321*c* in the corresponding sub-channels, to drive the support member 321 to move far away from the primary shaft mechanism 31 along the direction of the arrow a. In this way, the flexible screen 10 on one side of the support member 321 is flattened.

In this embodiment of this application, the at least a part of each of the two connection parts 3322 is disposed in the corresponding sub-channel, to further ensure that each connection part 3322 and the elastic member 331 on the connection part 3322 move stably along the corresponding sub-channel. This avoids a left-right shift of each connection part 3322 in a direction perpendicular to the flattened direction, and avoids interference when the two connection parts 3322 and the elastic members 331 on the two connection parts 3322 move.

As shown in FIG. 17, when there are the plurality of connection parts 3322, there may be a plurality of support parts 332*a* on the main part 3321, where each support part 332*a* is disposed at one end of a corresponding connection part 3322. This can ensure that each connection part 3322 moves more stably in the installation channel 324, and further improves stability of the push block 332 on the support member 321. For example, when there are two connection parts 3322, two support parts 332*a* may be disposed on the main part 3321, where one support part 332*a* is located at one end of the first connection part 3322*a*, and the other support part 332*a* is located at one end of the second connection part 3322*b*.

Correspondingly, as shown in FIG. 14, a plurality of sliding slots 3213 for the support part 332*a* to slide may be disposed on the support member 321. For example, two sliding slots 3213 are disposed on the support member 321, and separately include a first sliding slot 3213*a* and a second sliding slot 3213*b*, where the first sliding slot 3213*a* is used for one support part 332*a* to slide, and the second sliding slot 3213*b* is used for the other support part 332*a* to slide. This ensures movement stability, on the support member 321, of the push block 332 having two connection parts 3322.

As shown in FIG. 7 to FIG. 10, each rotation mechanism 32 includes at least one swing arm 322, a first end of the swing arm 322 is rotatably connected to the primary shaft mechanism 31, and a second end of the swing arm 322 is connected to a corresponding framing member 20. For example, a first end of a swing arm 322 of one rotation mechanism 32 is rotatably connected to the primary shaft mechanism 31, and a second end of the swing arm 322 is connected to the first framing member 21 (as shown in FIG. 4). A first end of a swing arm 322 of the other rotation mechanism 32 is rotatably connected to the primary shaft mechanism 31, and a second end of the swing arm 322 is connected to the second framing member 22 (as shown in FIG. 4).

The swing arm 322 is located on a side of the second surface 3212 of the support member 321, and the swing arm 322 is connected to the support member 321 (for example, by using a housing connecting rod 323 to be mentioned below), and the flexible screen 10 (for example, the third display region 13) is connected to the first surface 3211 (for example, through glue line bonding).

In addition, as shown in FIG. 10, the first end (as shown by s in FIG. 10) of the swing arm 322 is an end that is of the swing arm 322 and that faces the primary shaft mechanism 31, and the second end (as shown by t in FIG. 10) of the swing arm 322 is an end that is of the swing arm 322 and that faces away from the primary shaft mechanism 31.

As shown in FIG. 7, an example in which each rotation mechanism 32 includes one swing arm 322 is used. The swing arm 322 is located on one side of the axial line l of the primary shaft mechanism 31, and the first end of each swing arm 322 is rotatably connected to the primary shaft mechanism 31. In this way, the swing arm 322 is rotatable around the primary shaft mechanism 31. When the swing arms 322 rotate facing each other around the primary shaft mechanism 31 along the direction shown by the arrow b in FIG. 7 until inner surfaces of the two swing arms 322 on two sides of the primary shaft mechanism 31 face each other, as shown in FIG. 9, the hinge component 30 is in the folded state.

When the swing arms 322 rotate facing away from each other around the primary shaft mechanism 31 along the direction shown by the arrow c in FIG. 9 until the swing arm 322 is in the flattened direction, as shown in FIG. 7, the hinge component 30 is in the flattened state, and the state of the hinge component 30 shown in FIG. 8 is between flattened state and the folded state, that is, the half-folded state.

As shown in FIG. 7, when the swing arm 322 drives the support member 321 to rotate around the primary shaft mechanism 31 to a flattened state, the first end of the swing arm 322 can also move relative to the primary shaft mechanism 31. In other words, the support member 321 drives the swing arm 322 to move far away from the primary shaft mechanism 31.

It may be understood that a position at which the first end of the swing arm 322 rotates around and cooperates with the primary shaft mechanism 31 has a movement gap, to enable the swing arm 322 to be driven to move far away from the primary shaft mechanism 31 when the support member 321 moves far away from the primary shaft mechanism 31.

It should be noted that, after the support member 321 drives the swing arm 322 to move far away from the primary shaft mechanism 31, the first end of the swing arm 322 and the primary shaft mechanism 31 maintain rotation and cooperation (as shown in FIG. 7).

A second end of a swing arm 322 of a rotation mechanism 32 is connected to a corresponding framing member 20. In this way, each swing arm 322 may drive the corresponding framing member 20 to rotate in a rotation process. For example, the swing arm 322 on one side of the primary shaft mechanism 31 drives the first framing member 21 to rotate, and the swing arm 322 on another side of the primary shaft mechanism 31 drives the second framing member 22 to rotate. In this way, when the swing arms 322 on the two sides rotate facing each other around the primary shaft mechanism 31, the first framing member 21 and the second framing member 22 also rotate facing each other until the inner surfaces of the swing arms 322 on the two sides face each other, and the hinge component 30 drives the first framing member 21 and the second framing member 22 to be in the folded state, so that the flexible screen 10 on the hinge component 30 and the two framing members 20 is also bent to the folded state. When the swing arms 322 on the two sides rotate facing away from each other around the primary shaft mechanism 31, the first framing member 21 and the second framing member 22 also rotate facing away from each other until the swing arms 322 on the two sides are in the flattened direction, and the hinge component 30 drives the first framing member 21 and the second framing member 22 to be in the flattened state, so that the flexible screen 10 on the hinge component 30 and the two framing members 20 is also unfolded to the flattened state.

When the swing arm 322 drives the support member 321 to rotate around the primary shaft mechanism 31 to the flattened state, the support member 321 drives the swing arm 322 to move far away from the primary shaft mechanism 31, and the second end of the swing arm 322 can drive the corresponding framing members 20 to move far away from the primary shaft mechanism 31, to further ensure that the flexible screen 10 is flattened under driving of the framing member 20 and the rotation mechanism 32.

In actual application, each rotation mechanism 32 may have a plurality of swing arms 322, the plurality of swing arms 322 are disposed along an axial direction of the primary shaft mechanism 31 at an interval, and the plurality of swing arms 322 rotate around the primary shaft mechanism 31 at the same time, so that the hinge component 30 randomly switches between the flattened state and the folded state, and thus the first framing member 21 and the second framing member 22 on two sides of the hinge component 30 are driven to switch between the flattened state and the folded state.

All the swing arms 322 and the elastic component 33 are located on a same side of the support member 321. For example, all the swing arms 322 and the elastic component 33 are located on the outer surface of the support member 321, and a part of the flexible screen 10, for example, the third display region 13, is located on the inner surface of the support member 321.

Each swing arm 322 is connected to the support member 321. For example, each swing arm 322 may be connected to the support member 321 by using the housing connecting rod 323 (to be mentioned below), so that one end of the support member 321 is rotatably connected to the primary shaft mechanism 31 by using the swing arm 322, and another end of the support member 321 is connected to a corresponding framing member 20 by using the swing arm 322. When all the swing arms 322 rotate around the primary shaft mechanism 31, the support member 321 may rotate around the primary shaft mechanism 31 under driving of all the swing arms 322, so that the flexible screen 10 and the elastic component 33 on two sides of the support member 321 rotate around the primary shaft mechanism 31, and it is further ensured that a first end of the elastic component 33 can interfere with the primary shaft mechanism 31 when the rotation mechanism 32 rotates to the flattened state, and the support member 321 is further driven to move far away from the primary shaft mechanism 31. This ensures that the flexible screen 10 is flattened.

In addition, when the rotation mechanism 32 rotates to the flattened state, the plurality of swing arms 322 may move far away from the primary shaft mechanism 31 under driving of the support member 321, to stably drive a corresponding framing member 20 to move far away from the primary shaft mechanism 31, so that the framing member 20 drives the flexible screen 10 to be flattened.

As shown in FIG. 7, each rotation mechanism 32 may further include at least one housing connecting rod 323. The housing connecting rod 323 is located on the support member 321, and is located on a same side of the support member 321 as the swing arm 322 and the elastic component 33. For example, the housing connecting rod 323, the swing arm 322, and the elastic component 33 are all located on the outer surface of the support member 321.

When the second end t of the swing arm 322 is connected to a corresponding framing member 20, an indirect connection between the second end t of the swing arm 322 and the corresponding framing members 20 may be implemented by using the housing connecting rod 323. For example, the second end t of the swing arm 322 is rotatably connected to the housing connecting rod 323, and the housing connecting rod 323 is connected to the corresponding framing members 20. For example, the housing connecting rod 323 is connected to a middle frame of the foldable-screen device.

In addition, the housing connecting rod 323 is further connected to the support member 321, so that when the swing arm 322 is connected to the support member 321, the swing arm 322 may be connected to the support member 321 by using the housing connecting rod 323, to improve connection stability between the swing arm 322 and the support member 321; and the swing arm 322 drives, by using the housing connecting rod 323, the support member 321 to rotate stably around the primary shaft mechanism 31, to ensure that the first end of the elastic component 33 can interfere with the primary shaft mechanism 31 when the support member 321 rotates to the flattened state. In this way, the support member 321 moves far away from the primary shaft mechanism 31 under driving of the elastic component 33, and drives, by using the swing arm 322 and the housing connecting rod 323, the corresponding framing members 20 to move far away from the primary shaft mechanism 31, so that the support member 321 and the framing member 20 drive the flexible screen 10 to be flattened when the support member 321 and the framing member 20 are in the flattened state.

As shown in FIG. 7, when the swing arm 322 and the housing connecting rod 323 drive the support member 321 to rotate around the primary shaft mechanism 31 to the flattened state, the support member 321 may simultaneously drive the swing arm 322 and the housing connecting rod 323 to move far away from the primary shaft mechanism 31, so that the housing connecting rod 323 drives the corresponding framing members 20 to move far away from the primary shaft mechanism 31, and it is further ensured that the flexible screen 10 is flattened under driving of the framing member 20 and the rotation mechanism 32.

It may be understood that, one end that is of the housing connecting rod 323 and that is close to the primary shaft mechanism 31 is independent of the primary shaft mechanism 31, that is, the two are not connected, to ensure that the housing connecting rod 323 can also move relative to the primary shaft mechanism 31 when the support member 321 moves far away from the primary shaft mechanism 31.

It may be understood that one end of the housing connecting rod 323 has a connection member 32a (refer to FIG. 5), and the housing connecting rod 323 may be connected to the framing member 20 by using the connection member 32a.

It may be understood that, when the rotation mechanism 32 includes the plurality of swing arms 322, there are a plurality of corresponding housing connecting rods 323, and the plurality of housing connecting rods 323 are disposed in a one-to-one correspondence with the swing arms 322. In other words, the second end t of each swing arm 322 is connected to a corresponding housing connecting rod 323, and each housing connecting rod 323 is connected to the framing member 20, so that the plurality of swing arms 322 drive, by using the corresponding housing connecting rods 323, the framing member 20 to move.

It should be noted herein that values and value ranges in embodiments of this application are approximate values, and an error within a specific range may exist due to impact of a manufacturing process. A person skilled in the art may consider that the error is negligible.

In descriptions of embodiments of this application, it should be noted that, unless otherwise clearly specified and limited, the terms "installation", "connected to", and "connection" should be understood in a broad sense. For example, the connection may be a fixed connection, may be an indirect connection by using an intermediate medium, or may be an internal connection between two elements or an interaction relationship between two elements. For a person of ordinary skill in the art, specific meanings of the foregoing terms in embodiments of this application may be understood based on a specific situation.

In the specification, claims, and accompanying drawings of embodiments of this application, the terms "first", "second", "third", "fourth", and so on (if existent) are intended to distinguish between similar objects but do not necessarily indicate a specific order or sequence.

What is claimed is:

1. A foldable-screen device, comprising a flexible screen, two framing members, and a hinge component located between the two framing members, wherein:
   the flexible screen is located on a surface of a same side of the two framing members and the hinge component;
   the hinge component comprises a primary shaft mechanism and two rotation mechanisms that are located on two sides of the primary shaft mechanism and that are rotatably connected to the primary shaft mechanism, wherein each rotation mechanism comprises a support member, a first end of the support member is rotatable around the primary shaft mechanism, a second end of the support member is connected to a corresponding framing member, and a part of the flexible screen is connected to a surface of one side of the support member; and
   an elastic component is further disposed on the support member, a first end of the elastic component presses against the primary shaft mechanism when the rotation mechanism rotates to a flattened state, a second end of the elastic component is connected to the support member, and a compression rate of the elastic component when the rotation mechanism rotates to the flattened state is greater than a compression rate of the elastic component when the rotation mechanism rotates to a folded state.

2. The foldable-screen device according to claim 1, wherein the support member has an installation channel, and one side that is of the installation channel and that faces the primary shaft mechanism has a first opening; and
   at least a part of the elastic component is accommodated in the installation channel, the second end of the elastic component presses against an inner wall of the installation channel, and the first end of the elastic component presses against the primary shaft mechanism through the first opening.

3. The foldable-screen device according to claim 2, wherein the elastic component comprises an elastic member and a push block; and
   a first end of the push block extends out to an outside of the first opening and cooperates with the primary shaft mechanism, a second end of the push block presses against the first end of the elastic component, and the second end of the elastic component presses against the inner wall of the installation channel.

4. The foldable-screen device according to claim 3, wherein the primary shaft mechanism has a holding part, and the holding part is located on a side wall that is of the primary shaft mechanism and that faces the push block; and
   when the support member rotates to a flattened state, one or more parts of a surface of the first end of the push block are supported on the holding part.

5. The foldable-screen device according to claim 4, wherein the holding part comprises a free end and a constraint end that are disposed opposite to each other along an axial direction perpendicular to the primary shaft mechanism; and
   the constraint end is close to an axial line of the primary shaft mechanism, the free end is far away from the axial line of the primary shaft mechanism, and a distance between the free end and an outer surface of the primary shaft mechanism is greater than a distance between the constraint end and the outer surface of the primary shaft mechanism.

6. The foldable-screen device according to claim 4, wherein at least a part of a surface that is of the holding part and that faces the push block is a first arc surface, the one or more parts of the surface of the first end of the push block being a second arc surface cooperating with the first arc surface.

7. The foldable-screen device according to claim 5, wherein the side wall that is of the primary shaft mechanism and that faces the push block further has a reinforcement part, and the constraint end of the holding part is connected to the reinforcement part; and
   a part of the surface of the first end of the push block cooperates with the reinforcement part.

8. The foldable-screen device according to claim 4, wherein the push block has a support part, and the support part is located on one side that is of the push block and that faces the flexible screen; and the support part is supported on a surface of the support member.

9. The foldable-screen device according to claim 8, wherein the support member has a sliding slot, and at least a part of the sliding slot is disposed between the first opening and the primary shaft mechanism; and the support part is slidably disposed in the sliding slot.

10. The foldable-screen device according to claim 8, wherein the push block comprises a main part and at least one connection part; and one end of the main part is connected to the at least one connection part, another end of the main part cooperates with the primary shaft mechanism, the support part of the push block is located on the main part, and at least a part of the elastic member is sleeved on the at least one connection part.

11. The foldable-screen device according to claim 10, wherein the inner wall of the installation channel has a pressing part, and a second end of the elastic member presses against one side that is of the pressing part and that faces the first opening; and one end that is of the installation channel and that faces away from the primary shaft mechanism has a second opening, and the at least one connection part movably penetrates the second opening.

12. The foldable-screen device according to claim 11, wherein the pressing part is disposed along a circumferential direction of the installation channel, and one end that is of the pressing part and that faces away from the inner wall of the installation channel encloses the second opening.

13. The foldable-screen device according to claim 12, wherein the elastic component further comprises a positioning member;

the positioning member is sleeved on one end that is of the connection part and that faces away from the main part, and at least a part of the elastic member is located between the main part and the positioning member; and the positioning member is located on one side that is of the pressing part and that faces away from the first opening.

14. The foldable-screen device according to claim 10, wherein the at least one connection part comprises two connection parts, and the two connection parts are disposed at one end of the main part at an interval; and the elastic member is a first elastic member, the elastic component further comprises a second elastic member, and each of the first elastic member and the second elastic member is sleeved on a corresponding connection part of the two connection parts.

15. The foldable-screen device according to claim 14, wherein the installation channel has an isolation part, and the isolation part separates the installation channel into two sub-channels; and the two sub-channels are disposed side by side along a direction parallel to an axial line of the primary shaft mechanism, and at least a part of each of the two connection parts is disposed in a corresponding sub-channel.

16. The foldable-screen device according to claim 1, wherein each rotation mechanism further comprises a plurality of swing arms, wherein a first end of each swing arm is rotatably connected to the primary shaft mechanism, a second end of each swing arm is connected to a corresponding framing member, the plurality of swing arms and the elastic component are located on a same side of the support member, each swing arm is connected to the support member, and a position at which the first end of the swing arm rotates around and cooperates with the primary shaft mechanism has a movement gap, to enable the swing arm to be driven to move far away from the primary shaft mechanism when the support member moves far away from the primary shaft mechanism.

17. The foldable-screen device according to claim 16, wherein each rotation mechanism further comprises a plurality of housing connecting rods, the plurality of housing connecting rods are located on the support member, and the plurality of housing connecting rods and the plurality of swing arms are disposed in a one-to-one correspondence;

the second end of the swing arm is rotatably connected to the housing connecting rod, and each housing connecting rod is connected to the support member, to enable the housing connecting rod to be driven to move far away from the primary shaft mechanism when the support member moves far away from the primary shaft mechanism; and the housing connecting rod is connected to a corresponding framing member.

18. A hinge component, comprising a primary shaft mechanism and two rotation mechanisms that are located on two sides of the primary shaft mechanism and that are rotatably connected to the primary shaft mechanism, wherein each rotation mechanism comprises a support member, a first end of the support member is rotatable around the primary shaft mechanism, a second end of the support member is connected to a framing member of a foldable-screen device, and a part of a flexible screen is connected to a surface of one side of the support member; and an elastic component is disposed on the support member, a first end of the elastic component presses against the primary shaft mechanism when the rotation mechanism rotates to a flattened state, a second end of the elastic component connects to the support member when the rotation mechanism rotates to the flattened state, and a compression rate of the elastic component when the rotation mechanism rotates to the flattened state is greater than a compression rate of the elastic component when the rotation mechanism rotates to a folded state.

19. The hinge component according to claim 18, wherein the support member has an installation channel, and one side that is of the installation channel and that faces the primary shaft mechanism has a first opening; and at least a part of the elastic component is accommodated in the installation channel, the second end of the elastic component presses against an inner wall of the installation channel, and the first end of the elastic component presses against the primary shaft mechanism through the first opening.

20. The hinge component according to claim 19, wherein the elastic component comprises an elastic member and a push block; and a first end of the push block extends out to an outside of the first opening and cooperates with the primary shaft mechanism, a second end of the push block presses against the first end of the elastic component, and the second end of the elastic component presses against the inner wall of the installation channel.

* * * * *